United States Patent
Kim et al.

(10) Patent No.: US 10,149,203 B2
(45) Date of Patent: *Dec. 4, 2018

(54) SERVER FOR CONTROL PLANE IN MOBILE COMMUNICATION NETWORK AND METHOD FOR ENABLING THE SERVER TO CONTROL SERVICE

(71) Applicant: LG ELECTRONICS INC., Seoul (KR)

(72) Inventors: Taehyeon Kim, Anyang-si (KR); Laeyoung Kim, Anyang-si (KR); Jaehyun Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,789

(22) Filed: Nov. 23, 2016

(65) Prior Publication Data

US 2017/0078923 A1    Mar. 16, 2017

Related U.S. Application Data

(63) Continuation of application No. 13/984,747, filed as application No. PCT/KR2012/000877 on Feb. 7, 2012, now Pat. No. 9,538,424.

(Continued)

(30) Foreign Application Priority Data

Feb. 6, 2012    (KR) .................. 10-2012-0011992

(51) Int. Cl.
*H04W 28/12*    (2009.01)
*H04W 8/02*    (2009.01)
(Continued)

(52) U.S. Cl.
CPC ............. *H04W 28/12* (2013.01); *H04W 4/06* (2013.01); *H04W 8/02* (2013.01); *H04W 8/18* (2013.01);
(Continued)

(58) Field of Classification Search
CPC ... H04W 28/12; H04W 28/08; H04W 84/045; H04W 4/06; H04L 12/26
See application file for complete search history.

(56) References Cited

U.S. PATENT DOCUMENTS 8,811,317 B2    8/2014 Liang et al.
2010/0278108 A1    11/2010 Cho et al.
(Continued)

FOREIGN PATENT DOCUMENTS

CN    101925064 A    12/2010
JP    2013-500648 A    1/2013
(Continued)

OTHER PUBLICATIONS

3rd Generation Partnership Project; Technical Specification Group Services and System Aspects; Local IP Access and Selected IP Traffic Offload (Release 10), 3GPP TR 23.829 V1.3.0 (Sep. 2010).*
(Continued)

*Primary Examiner* — Shailendra Kumar
(74) *Attorney, Agent, or Firm* — Birch, Stewart, Kolasch & Birch, LLP

(57) ABSTRACT

A method and a network entity for controlling a service in charge of a control plane in a network are discussed. The method according to an embodiment includes receiving subscription information including an indicator related to a selected internet protocol (IP) traffic offload (SIPTO). The method further includes triggering a re-establishment of the SIPTO when a movement of a user equipment from an (e)Node B to a Home (e)Node B is detected; allowing the (Continued)

SIPTO excluding a SIPTO at the local network based on an access point name (APN) when the indicator indicates that the SIPTO is allowed and the SIPTO at the local network is excluded; and allowing the SIPTO including the SIPTO at the local network based on the APN when the indicator indicates that the SIPTO is allowed and the SIPTO at the local network is included.

9 Claims, 9 Drawing Sheets

Related U.S. Application Data

(60) Provisional application No. 61/502,849, filed on Jun. 29, 2011, provisional application No. 61/442,283, filed on Feb. 13, 2011, provisional application No. 61/441,661, filed on Feb. 11, 2011.

(51) Int. Cl.
    *H04W 8/18*     (2009.01)
    *H04W 4/06*     (2009.01)
    *H04W 28/08*     (2009.01)
    *H04W 84/04*     (2009.01)
    *H04W 36/00*     (2009.01)
    *H04L 12/26*     (2006.01)

(52) U.S. Cl.
    CPC ............ *H04W 28/08* (2013.01); *H04L 43/00* (2013.01); *H04W 36/0022* (2013.01); *H04W 84/045* (2013.01)

(56) References Cited

U.S. PATENT DOCUMENTS

| | | |
|---|---|---|
| 2011/0170469 A1 | 7/2011 | Watfa et al. |
| 2011/0171953 A1* | 7/2011 | Faccin .................. H04W 48/08 455/426.1 |
| 2012/0039304 A1 | 2/2012 | Kim et al. |
| 2012/0117257 A1 | 5/2012 | Huo et al. |
| 2012/0134319 A1 | 5/2012 | Kahn et al. |
| 2012/0189016 A1 | 7/2012 | Bakker et al. |
| 2013/0227644 A1* | 8/2013 | Zhu ....................... H04W 12/08 726/3 |

FOREIGN PATENT DOCUMENTS

| | | |
|---|---|---|
| KR | 10-2010-0119349 A | 11/2010 |
| KR | 10-2010-0119477 A | 11/2010 |
| KR | 10-2010-0120259 A | 11/2010 |
| WO | WO 2010/128773 A2 | 11/2010 |
| WO | WO 2011/012012 A1 | 2/2011 |

OTHER PUBLICATIONS

Alcatel-Lucent, "[Draft] LS on LIPA/SIPTO Stage 1 Clarification," 3GPP TSG-SA WG2 Meeting #79, Tdoc S2-102906, Kyoto, Japan, May 10-14, 2010, 3 pages.

Catt, "Offload Mechanism for LIPA/SIPTO Based on Solution 2," 3GPP TSG SA WG2 Meeting #79, TD S2-102138, SA WG2 Temporary Document, Kyoto, Japan, May 10-14, 2010, pp. 1-3.

Ericsson et al., "Selection of GW Co-located with H(e)NB for SIPTO and LIPA," 3GPP TSG SA WG2 Meeting #79, TD S2-102466, SA WG2 Temporary Document, Kyoto, Japan, May 10-14, 2010, pp. 1-16.

Huawei, "SIPTO Permission Indicator," 3GPP TSG CT4 Meeting #49bis, C4-101695, Change Request, Dublin, Ireland, Jun. 29-Jul. 2, 2010, 9 pages.

LG Electronics, "SIPTO for H(e)NB Subsystem Policy Clarification," 3GPP TSG SA Meeting #50, SP-100818, Istanbul, Turkey, Dec. 13-15, 2010, 5 pages.

Research in Motion UK LTD. et al., "Notify UE when a HNB Provides Access to a Residential/enterprise IP Network," 3GPP TSG-CT WG1 Meeting #69, C1-110464, Change Request, Ljubljana, Slovenia, Jan. 24-28, 2011, 11 pages.

Samsung, "SIPTO HENB/HNB", 3GPP TSG SA WG2 Meeting #79, TD S2-102387, Kyoto, Japan, May 10-14, 2010, 5 pages.

ZTE, "Discussion on LIPA_SIPTO Solution", 3GPP TSG SA WG2 Meeting #76, TD S2-096637, Cabo, Mexico, Nov. 16-20, 2009, 7 pages.

3rd Generation Partnership Project, "Technical Specification Group Services and System Aspects", Local IP Access and Selected IP Traffic Offload (Release 10), Sep. 2010, 3GPP 23.829 v1 .3.0, 44 pages.

Nec et al., "Use Case for Continuity of Data Sessions to Local Networks," 3GPP TSG-SA WG1 Meeting #53, Nashville, Tennessee, USA, Feb. 14-18, 2011, S1-110025, 4 pages.

Qualcomm Incorporated, "Open issues for LIPA/SIPTO solution for H(e)NB using a local PDN connection in Solution 1", 3GPP TSG SA WG2 Meeting #77, TD S2-100082, Shenzhen, China, Jan. 18-22, 2010, 8 pages.

Roh et al., "Femtocell Traffic Offload Scheme for Core Networks", Feb. 7-10, 2011, IEEE 4th IFIP International Conference on New Technologies, Mobility and Security (NTMS), Paris, 7 pages.

* cited by examiner

SERVER FOR CONTROL PLANE IN MOBILE COMMUNICATION NETWORK AND METHOD FOR ENABLING THE SERVER TO CONTROL SERVICE

CROSS-REFERENCE TO RELATED APPLICATIONS

This Application is a Continuation of U.S. patent application Ser. No. 13/984,747 filed on Aug. 9, 2013 (now U.S. Pat. No. 9,538,424 issued on Jan. 3, 2017), which is filed as the National Phase of PCT/KR2012/000877 filed on Feb. 7, 2012, which claims the benefit under 35 U.S.C. § 119(e) to U.S. Provisional Application Nos. 61/502,849 filed on Jun. 29, 2011, 61/442,283 filed on Feb. 13, 2011, and 61/441,661 filed on Feb. 11, 2011, and under 35 U.S.C. § 119(a) to Korean Patent Application No. 10-2012-0011992 filed on Feb. 6, 2012, all of which are hereby expressly incorporated by reference into the present application.

BACKGROUND OF THE INVENTION

Field of the Invention

The present invention relates to a server in charge of a control plane in a mobile communication network and a method of controlling a service, which is controlled by the server.

Discussion of the Related Art

In order to deal with many forums related to a fourth generation mobile communication and a new technology, 3GPP for establishing a technology standard of a third generation mobile communication system has started to conduct a study on LTE/SAE (Long Term Evolution/System Architecture Evolution) technology by the end of 2004 in a bid to optimize and enhance performance of 3GPP technologies.

The SAE proceeded centering on 3GPP SA WG2 is a study on a network technology having a purpose of determining a network structure in a manner of juggling an LTE job of 3GPP TSG RAN and the purpose of supporting mobility between heterogeneous networks. Currently, the SAE is one of important standardization issues of 3GPP. This is a job to develop a 3GPP system to a system supporting various radio access technologies based on an IP. The job has been progressed to achieve a target of an optimized packet-based system minimizing a transmission delay with a more enhanced data transmission capability.

An SAE upper level reference model defined by the 3GPP SA WG2 includes a non-roaming case and roaming cases of various scenarios. Detail contents may refer to 3GPP standard document TS 23.400a and TS 23.400b. A diagram of a network structure in FIG. 1 corresponds to a simple reconstruction of the SAE upper level reference model.

FIG. 1 is a diagram of a structure of an evolved mobile communication network.

One of main characteristics of the network structure in FIG. 1 corresponds that the structure is based on a 2 Tier Model, i.e., an eNode B of Evolved UTRAN and a Gateway of a Core Network. Although it is not perfectly matched to each other, it is able to say that the eNode B 20 includes the function of a Node B and an RNC of a legacy UMTS system and the Gateway includes a function of SGSN/GGSN of a legacy system.

Another main characteristic of the network structure is that a Control Plane and a User Plane between an Access network and the Core Network are exchanged by an interface different from each other. In the legacy UMTS system, there exist one interface, i.e., Iu, between RNC and SGSN. On the other hand, since an MME (Mobility Management Entity) in charge of processing a control signal has a structure separated from the GW (Gateway), two types of interface, i.e., S1-MME and S1-U, can be used, respectively. The GW can be classified into a serving gateway (hereinafter abbreviated S-GW) 52 and a packet data network gateway (hereinafter abbreviated PDN-GW or P-GW) 53.

FIG. 2 is a diagram of a relationship between an (e)Node B and a Home (e)Node B.

An attempt to increase cell capacity in order to support such a high-capacity service as multimedia content, streaming, and the like and a bidirectional service in the third generation or the fourth generation mobile communication system continues.

In particular, since various transmission techniques of high-capacity are required according to a development of a communication and dissemination of a multimedia technology, it is able to allocate more frequency resources to increase radio capacity. Yet, since the frequency resource is limited, there exist a limit for allocating the limited frequency resource to a plurality of users.

In order to increase the cell capacity, an approach of using a high frequency band and the approach of reducing a cell radius have been tried. If such a cell of a small radius as a pico cell and the like are applied, since it is able to use a frequency band higher than the frequency band used in a legacy cellular system, more information can be delivered. Yet, since more base stations are necessary to be installed in an identical area, cost may dramatically increase instead.

As mentioned in the foregoing description, recently, a femto base station such as the Home (e)Node B is proposed among the approaches of increasing the cell capacity by using a small cell.

A study on the Home (e)Node B 30 has been started to conduct centering on RAN WG3 of 3GPP Home (e)Node B. Recently, the Home (e)Node B is also studied in SA WG in earnest.

The (e)Node B 20 depicted in FIG. 2 corresponds to a macro base station and the Home (e)Node B 30 may correspond to the femto base station. It is intended that the present specification is explained based on a terminology of 3GPP and the (e)Node B is used when a Node B and an eNode B are mentioned together. And, the Home (e)Node B is used when a Home Node B and a Home eNode B are mentioned together.

Interfaces depicted with dotted lines are used for transmitting a control signal between the (e)Node B 20, the Home (e)Node B 30 and the MME 510. And, the interfaces depicted with lines are used for transmitting a data of the user plane.

FIG. 3 indicates a problem according to a prior technology.

As depicted in FIG. 3, if a traffic is overloaded or congested in the interface between the (e)Node B 20 and the S-GW 52 or if the traffic is overloaded or congested in the interface between the Home (e)Node B and the S-GW 52, a downlink data to the UE 10 or an uplink data from the UE 10 is not correctly transmitted and failed.

Or, if the interface between the S-GW 52 and the PDN-GW 53 or the interface between the PDN-GW 53 and an IP (internet protocol) service network of a mobile communication service provider is overloaded or congested, the downlink data to the UE 10 or the upload data from the UE 10 is not properly transmitted and failed.

And, when the UE performs a handover from a cell where the UE is currently receiving a service to a different cell, if the different cell is in a state of being overloaded, a service of the UE is dropped.

In order to solve the aforementioned problem, mobile communication service providers have changed the S-GW 52 and the PDN-GW 53 with a gateway of a high capacity and have built additional equipments, by which entails significantly high cost. And, since the quantity of transceived data geometrically increases, although additional equipment is newly built, it becomes overloaded soon.

Meanwhile, various methods to optimize the S-GW 52 and the PDN-GW 53 without building an additional mobile communication network have been proposed. For instance, a specific IP traffic (e.g., internet service) of the UE is transmitted in a manner of selecting an optimal path in a macro access network and the specific IP traffic is transmitted in a femto access network (e.g., Home (e)NB) in a manner of detouring in a path via nodes of a public network, i.e., a wired network without transceiving the traffic via the path of the mobile communication network. The technique making a traffic detour (Selected IP traffic offload), i.e., a SIPTO has been proposed.

FIG. 4 is a diagram of a concept of a SIPTO (Selected IP traffic offload).

Referring to FIG. 4, such a mobile communication system as an EPS (evolved packet system) is depicted as an example. The EPS system includes an (e)Node B 20, an MME 51, an S-GW 52, and a P-GW 53. And, a Home (e)Node B 30 is depicted as well.

In this case, as depicted in FIG. 4, the SIPTO (Selected IP traffic offload) technique diverts a specific IP traffic (e.g., internet service) of the UE 10 to the nodes of a wired network 70 without passing through the nodes of an IP service network 60 of a mobile communication service provider.

For instance, if the UE 10 is allowed to access the (e)Node B 20, the UE 10 generates a session, which is passing through such a wired network 70 as a public communication network, via the (e)Node B 20 and can perform an IP network service via the session. In this case, service provider policy and subscription information may be considered.

In order to generate the session, in case of the UMTS, a local gateway in charge of a part of function of GGSN or, in case the EPS, a local gateway in charge of a part of function of P-GW (PDN gateway) can be used as a gateway installed near the (e)Node B 20.

This kind of local gateway is called a local GGSN or a local P-GW. A function of the local GGSN or the local P-GW is similar to that of the GGSN or the P-GW.

As mentioned in the foregoing description, the SIPTO technique has proposed a concept of generating a session to divert (offload) the data of the UE to such a wired network as a public communication network via the (e)Node B, i.e., a macro base station.

Yet, since the aforementioned legacy SIPTO technique makes a data of a user pass through a macro base station, i.e., (e)Node B 20, if the (e)Node B 20 is in a state of being overloaded, there still exist a problem.

SUMMARY OF THE INVENTION

Hence, an object of the present specification is to provide a technique enabling a data of a user to be diverted (offload) to such a wired network as a public communication network via a Home (e)Node B as well.

To achieve these and other advantages and in accordance with the purpose of the present invention, as embodied and broadly described, the present specification provides a technique enabling a data of a user to be diverted (offload) to such a wired network as a public communication network via a Home (e)Node B as well.

Specifically, the present specification provides a method of controlling a service in a server in charge of a control plane in a network. The method includes the steps of receiving a first message containing at least one selected from the group consisting of an APN (Access Point Name), a parameter indicating an identifier of a local gateway, and an indicator related to a SIPTO (Selected IP Traffic Offload) service, wherein the first message comprises a request message requested by a user equipment, if a SIPTO service is checked to be available in the Home (e)Node B based on the received first message, judging whether a SIPTO is applicable to a data of the user equipment based on the APN in the first message, wherein the APN contained in the first message is judged whether the APN is applicable to the SIPTO based on a pre-stored APN-related information in the step of judging, if the SIPTO is applicable to the data of the user equipment, determining whether the SIPTO service is provided to the user equipment based on an agreement information of a user for the SIPTO service, and transmitting a SIPTO service notification to the Home (e)Node B according to the decision.

Meanwhile, the present specification provides a server in charge of a control plane in a network. The server includes a transceiving unit configured to receive a first message including at least one selected from the group consisting of an APN (Access Point Name), a parameter indicating an identifier of a local gateway, and an indicator related to a SIPTO (Selected IP Traffic Offload) service. The first message can include a request message requested by a user equipment. And, if a SIPTO service is checked to be available in the Home (e)Node B based on the received first message, the server can include a control unit configured to judge whether a SIPTO is applicable to a data of the user equipment based on the APN, if the SIPTO is applicable to the data of the user equipment, the control unit configured to determine whether the SIPTO service is provided to the user equipment based on an agreement information of a user for the SIPTO service. The transceiving unit can transmit a SIPTO service notification to the Home (e)Node B according to the decision.

In order to judge whether the SIPTO is applicable, the control unit can judge whether the APN included in the first message is applicable to the SIPTO based on a pre-stored APN-related information.

The agreement information of a user for the SIPTO service transmits an information request message to the user equipment and the agreement information of a user for the SIPTO service can be included in an information response message received in response to the information request message.

An information response message including the agreement information of a user for the SIPTO service can be received when the user equipment performs an attach procedure, a TAU (Tracking Area Update) procedure, and a handover procedure.

The agreement information of a user for the SIPTO service may be obtained from a subscriber information server.

The method of controlling can further include at least one of the steps of determining whether a LIPA (Local IP Access) service is provided to the user equipment, transmitting a LIPA service permission information or a filter information to the local gateway according to the decision, and transmitting at least one of the LIPA service permission information, the filter information, and a notification for the LIPA service to the Home (e)node B.

In this case, the LIPA service permission information or the filter information can be used to determine whether the Home (e)Node B or the local gateway blocks a data for the LIPA service occurred by the user equipment. And, the notification for the LIPA service can be used to inform the user equipment of whether the LIPA service is permitted.

The SIPTO service notification may indicate an application of a SIPTO femto. The SIPTO femto may mean that the data of the user equipment is diverted via a home network connected to the Home (e)Node B.

The SIPTO service notification for indicating the application of the SIPTO femto may be a dedicated notification message different from a notification for indicating an application of a SIPTO macro. Alternatively, the SIPTO service notification for indicating the application of the SIPTO femto can be represented by an attribute value within a notification for indicating the application of the SIPTO service.

According to embodiment of the present specification, it is able to divert (offload) a data of a user to such a wired network as a public communication network via a Home (e)Node B as well.

Meanwhile, in case of diverting (offload) a data of a user to such a wired network as a public communication network via a Home (e)Node B as well, a LIPA service is selectively supported according to a user or a UE.

DETAILED DESCRIPTION OF THE EMBODIMENTS

Figure 1:
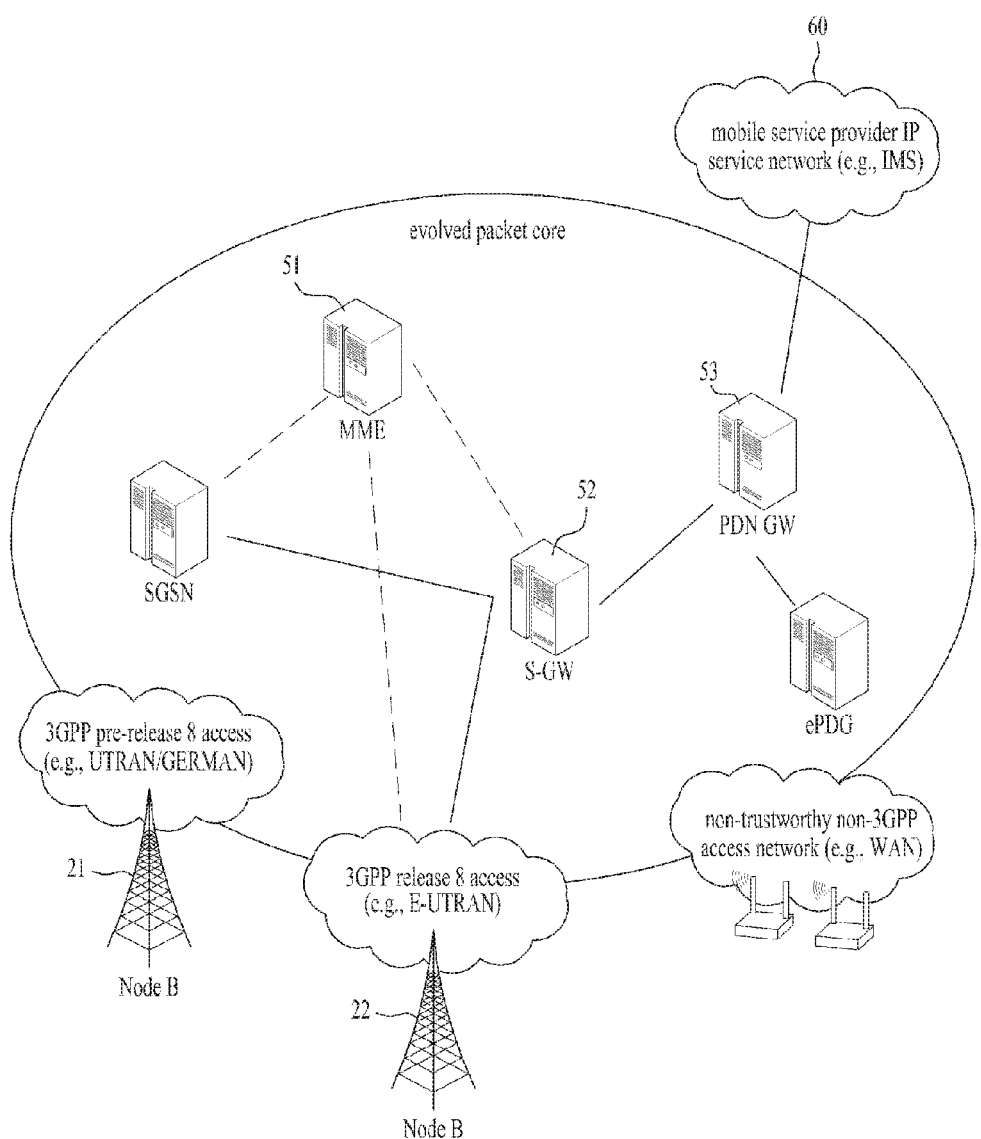
FIG. 1 is a diagram of a structure of an evolved mobile communication network.
Figure 2:
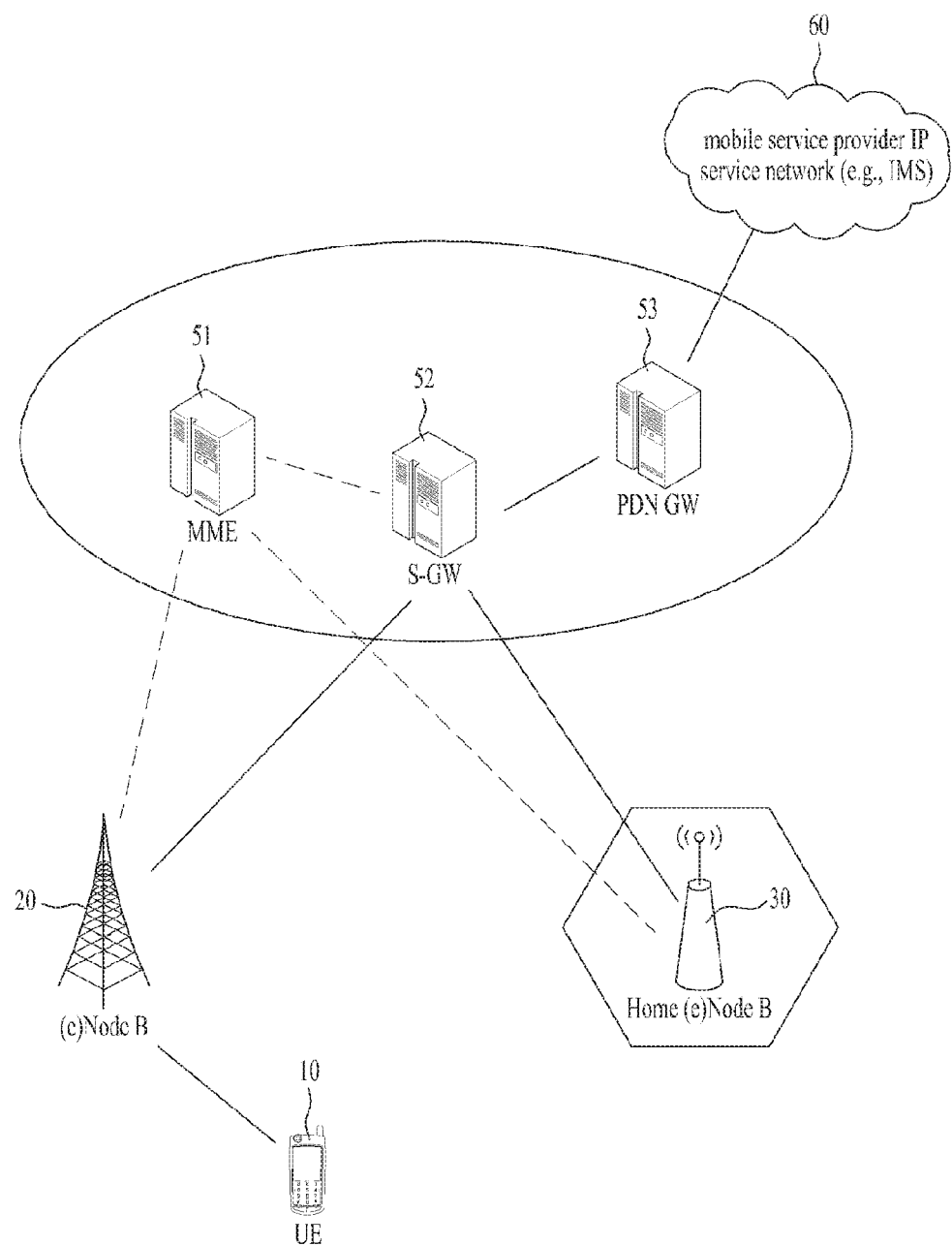
FIG. 2 is a diagram of a relationship between an (e)Node B and a Home (e)Node B.
Figure 3:
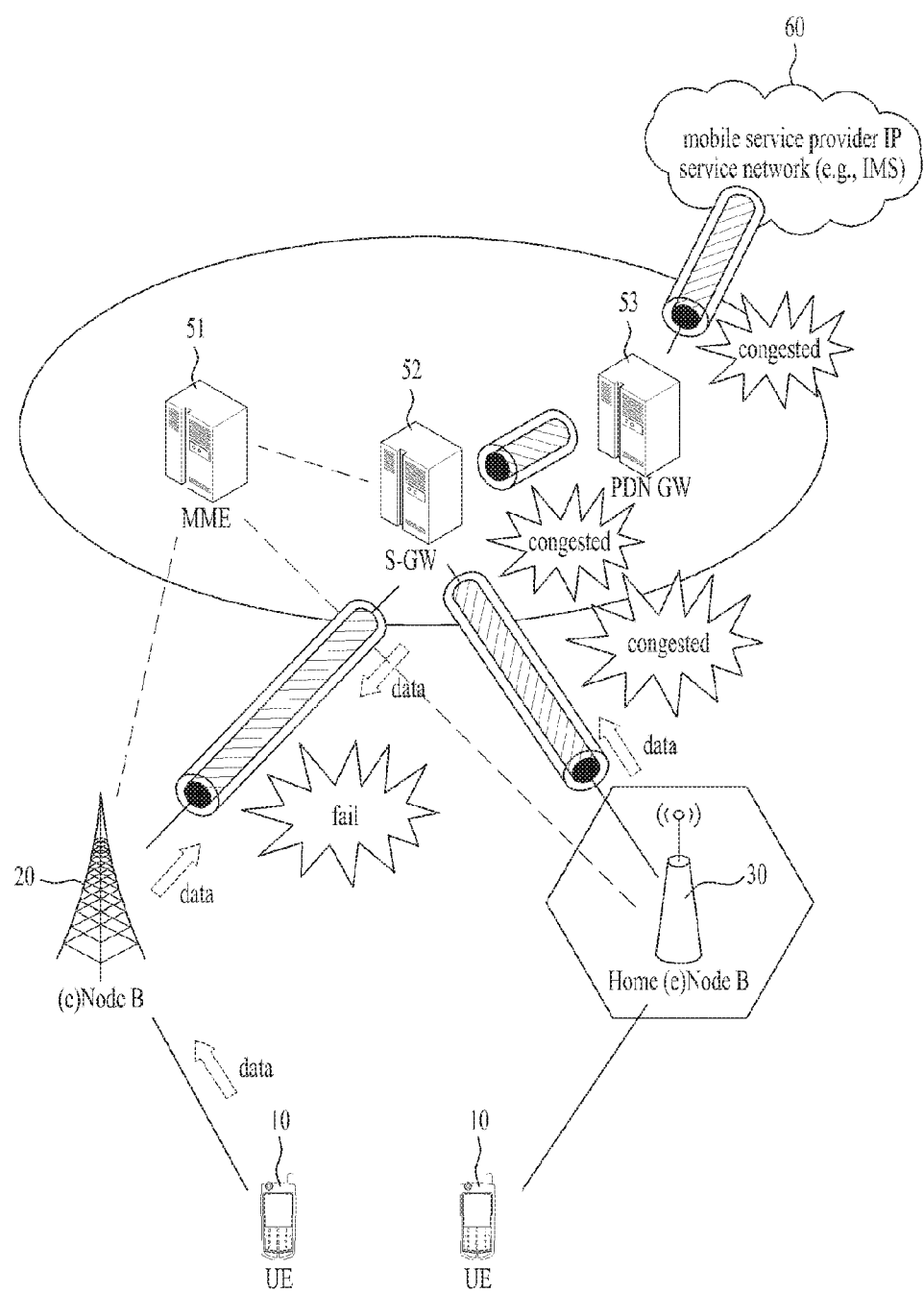
FIG. 3 is a diagram for showing a problem of a prior art.
Figure 4:
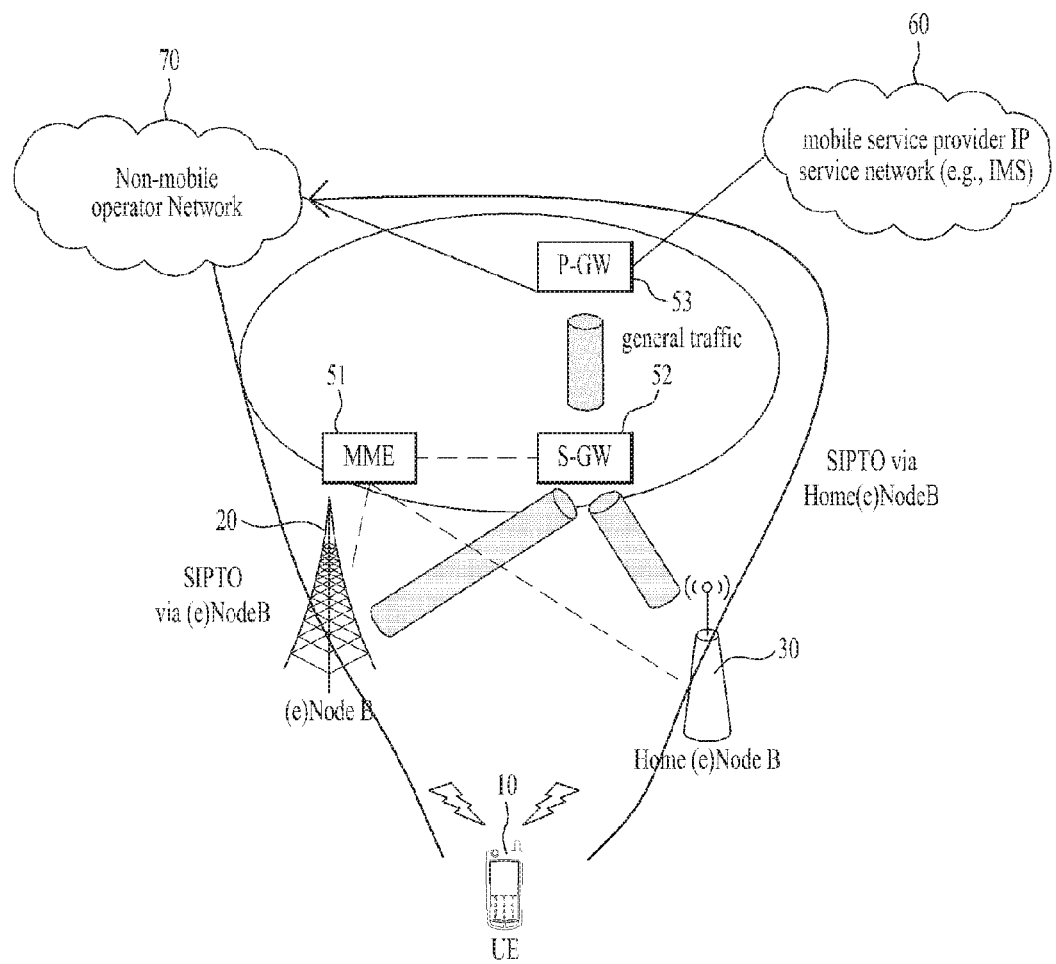
FIG. 4 is a diagram for a concept of a SIPTO (Selected IP Traffic Offload)

The present invention is explained on the basis of UMTS (universal mobile Telecommunication System) and an EPC (Evolved Packet Core). Yet, the present invention may be non-limited to this and can be applied to all communication systems and methods to which a technical idea of the present invention is applicable.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted. And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

In the attached drawings, although a UE (user equipment) is depicted as an example, the UE can be called such a terminology as a terminal, a mobile equipment (ME), and the like. And, the UE may correspond to such a portable device equipped with a communication function as a cellular phone, a PDA, a smart phone, a notebook, or the like. Or, the UE may correspond to such a device not capable of being carried as a PC, a vehicle mounted device.

Definition of a Terminology

Prior to the beginning of explanation with reference to drawings, the terms used in the present specification is briefly defined to help understand the present invention.

UMTS: an abbreviation for a Universal Mobile Telecommunication System.

It means a third generation mobile communication network.

EPS: an abbreviation for an Evolved Packet System. It means a core network supporting a LTE (Long Term Evolution) network.

PDN (public Data Network): it means an independent network where a service providing server is situated.

APN (Access Point Name): it is a name of an access point managed by a network and is provided to a UE. In particular, it indicates a name (character string) of the PDN. A corresponding PDN for transceiving a data is determined based on the name of the access point.

Access control: it means a control procedure for allowing a UE to use such an access system as a Home (e)node B or moving the UE to a different access system.

TEID (Tunnel Endpoint Identifier): it is an Endpoint ID of a tunnel configured between nodes in a network. It is configured according to a section in a bearer unit of each UE.

Node B: a base station of a UMTS network. It is installed in outdoor and a size of cell coverage corresponds to a macro cell.

eNode B: a base station of an EPS (Evolved Packet System) network. It is installed outdoor and a size of cell coverage corresponds to a macro cell.

(e)Node B: a terminology indicating a Node B and an eNode B.

Home Node B: a base station of a UMTS network. It is installed indoor. A size of cell coverage corresponds to a femto cell.

Home eNode B: a base station of an EPS network. It is installed indoor. A size of cell coverage corresponds to a femto cell.

Home (e)Node B: a terminology indicating a Home Node B and a Home eNode B.

Home (e)Node B gateway: a gateway plays a role of interfacing with a core network in a manner of being connected to at least one Home (e)Node B.

Home (e)Node B subsystem: a form managing a radio network in a manner of binding Home (e)Node B and a Home (e)node B gateway as a set. Since the Home (e)Node B subsystem and the Home (e)Node B manage a radio network and play a role of interlocking with a core network, it can be considered as a form of a set. Hence, in the following description, the terms of the Home (e)Node B subsystem and the Home (e)Node B can be used in a manner of being mixed.

MME: an abbreviation for a Mobility management Entity. It plays a role of controlling each entity in the EPS to provide a session and mobility for a UE.

Closed Subscriber Group (hereinafter abbreviated CSG): it means a group of one or more Home (e)Node Bs. The Home (e)Node Bs belonging to the CSG have an identical CSG ID. Each user receives an approval of use according to a CSG.

Closed Access Mode: it indicates that a Home (e)Node B operates as a CSG cell. It indicates that the Home (e)Node B operates in a manner of allowing an access only for a user equipment allowed to a corresponding cell. In particular, only the user equipment having authority for specific CSG IDs supported by the Home (e)Node B can access.

Open Access Mode: it indicates that a Home (e)node B operates in the same manner of a normal cell (non-CSG cell) without a concept of a CSG. In particular, it indicates that the Home (e)Node B operates like a normal (e)Node B.

Hybrid access mode: it indicates that a Home (e)Node B allows a user equipment of a non-closed subscriber to access, although the Home (e)Node B operates as a CSG cell. It is able to provide a Home (e)Node B service in a manner of allowing a user equipment having a specific CSG ID capable of supporting a corresponding cell to access. It indicates that the Home (e)Node B operates in a manner of allowing a user equipment having no CSG authority to access.

Selected IP traffic Offload (SIPTO): in case that a UE transmits a specific IP traffic via a Home (e)Node B or an (e)Node B, a technique to divert the specific IP traffic to such a wired network as the internet and the like instead of using a network of a mobile communication service provider (e.g., 3GPP, 3GPP2).

SIMTO femto (or femto SIPTO): in case that a UE transmits a specific IP traffic via a Home (e)Node B, a technique to divert the specific IP traffic to such a wired network as the internet and the like instead of using a network of a mobile communication service provider (e.g., 3GPP, 3GPP2).

SIMTO macro (or macro SIPTO): in case that a UE transmits a specific IP traffic via an (e)Node B, a technique to divert the specific IP traffic to such a wired network as the internet and the like instead of using a network of a mobile communication service provider (e.g., 3GPP, 3GPP2).

Local IP Access (LIPA): a technique connecting a Home (e)Node B to a local network (i.e., a small scale network, e.g., a home network in home or a company network) and enabling a UE in the Home (e)Node B to access the local network via the Home (e)Node B.

Local gateway: a gateway enabling LIPA or SIPTO via the Home (e)Node B, in particular, the gateway enabling a data to be transmitted to a home network or a wired network without passing through a core network. The local gateway is positioned between the Home (e)Node B and the wired network. The local gateway generates a bearer between the Home (e)Node B and the wired network and enables a data to be transmitted via the generated bearer.

Session: a session is a path to transmit a data and a unit of the session may correspond to a PDN, a bearer, and an IP flow unit, and the like. As defined in 3GPP, each unit can be classified into a whole network unit (APN or PDN unit), a unit distinguished by QoS in the whole network unit (bearer unit), and a destination IP address unit.

PDN connection: it indicates a connection from a UE to PDN, in particular, it indicates a relation (connection) between the UE represented as an IP address and the PDN represented as APN. This means a connection (UE-PDN GW) between entities in a core network to form a session.

UE context: situation information of a UE used to manage the UE in a network, in particular, the situation information consists of UE id, mobility (current position, etc.), an attribute of a session (QoS, priority, etc.).

Local PDN: such an independent individual network as a home network or an enterprise network, which is not an external PDN.

Local Home (e)Node B network: it means a network to access a local PDN and consists of a Home (e)Node B and an L-GW.

Local network: a network including a local Home (e)Node B network and a local PDN.

Meanwhile, a method proposed by the present specification is briefly explained in the following description.

Explanation on a method of providing a SIPTO service in a Home (e)Node B

The present specification proposes an architecture in order to divert (offload) a specific IP traffic of a UE to a public network, i.e., a path passing through nodes of a wired network via a Home (e)Node B instead of using a mobile communication network in a mobile communication system such as 3GPP UMTS (Universal Mobile Telecommunication System)/EPS (Evolved Packet System).

Regarding this, it is explained with reference to FIG. 5.

Figure 5:
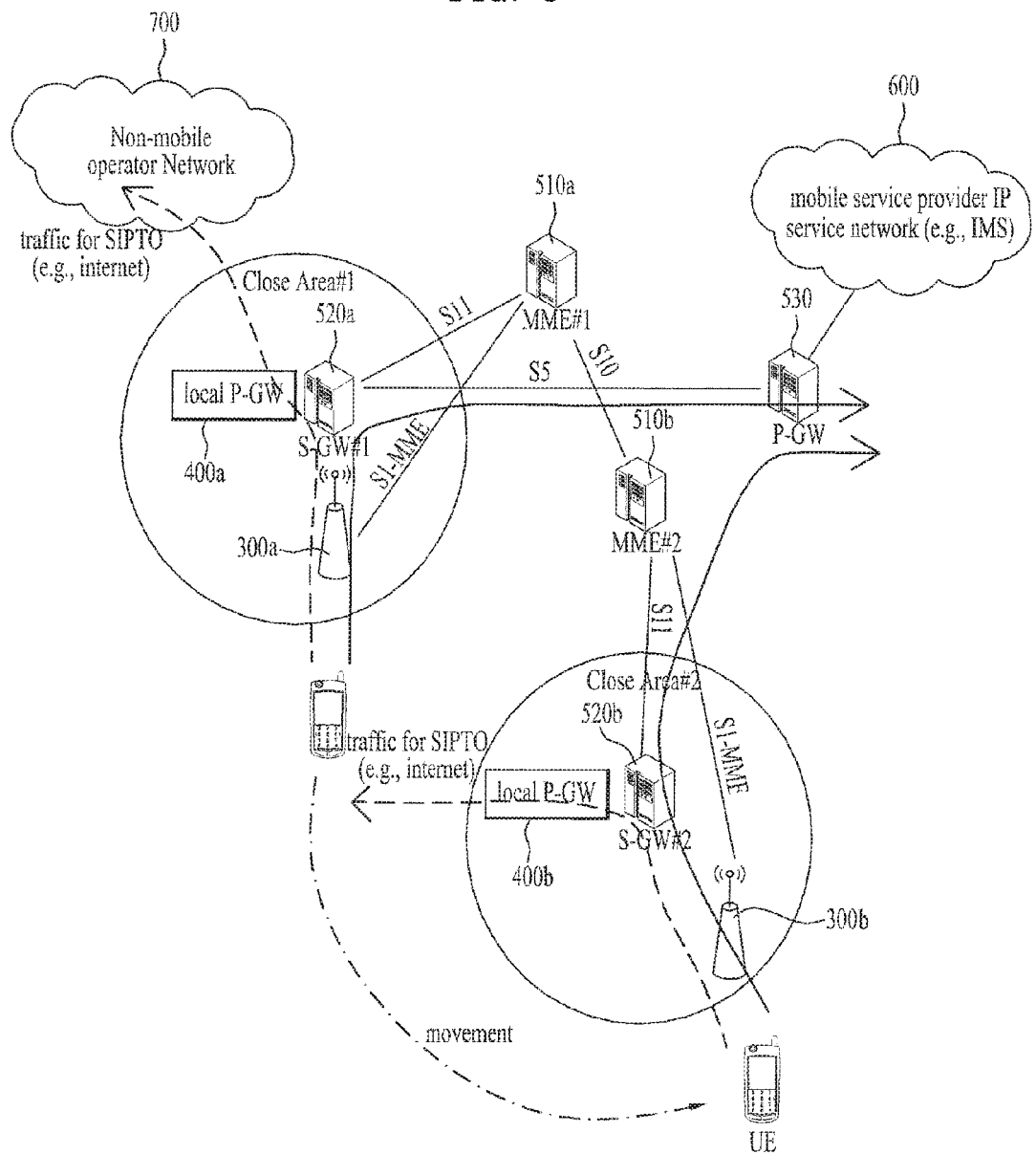
FIG. 5 is a diagram of an example of an architecture proposed by the present specification.

FIG. 5 is a diagram of an example of an architecture proposed by the present specification.

Referring to FIG. 5, an example of such a mobile communication system as an EPS (Evolved Packet System) is depicted. The EPS system includes a source eNode B 300a, a target eNode B 300b, a source local P-GW 400a, a target local P-GW 400b, a source MME 510a, a target MME 510b, a source S-GW 520a, a target S-GW 520b, a source P-GW 531, a target P-GW 532. The source eNode B 300a and the target eNode B may correspond to an (e)Node B or a Home (e)Node B.

The eNode Bs (300a/300b: hereinafter commonly called 300), the MMEs (510a/510b: hereinafter commonly called 510), the S-GWs (520a/520b: hereinafter commonly called 520), and the P-GWs (531/532: hereinafter commonly called 530) are based on the EPS.

The local gateway (400a/400b: hereinafter commonly called 400) is positioned between the eNode B 300 and a wired network 700 and corresponds to a gateway enabling SIPTO via the eNode B 300. The local gateway 400 enables a session to be generated via a path between the eNode B 300 and the wired network 700 and enables a data to be transmitted via the generated bearer.

The local gateway 400 may include a part or a whole function of a PDN-GW for the EPS system or may include a part or a whole function of a GGSN (Gateway GPRS Support Node) for UMTS. Yet, since the local gateway 400 enables a bearer to be generated via the path between the eNode B 300 and the wired network 700, the local gateway can be differentiated from the P-GW 520 of EPS or the GGSN of UMTS, which generates a bearer via a path to the mobile communication network 600. Hence, the local gateway can be called a local P-GW in EPS or a local GGSN in UMTS.

Meanwhile, although a system depicted in FIG. 5 is based on EPS, SIPTO depicted in FIG. 5 can be applicable to 3GPP UMTS (Universal Mobile Telecommunication System) as well. In the 3GPP UMTS, both a control plane function of the MME 510 and a user plane function of the S-GW 520 can be performed in SGSN (Serving GPRS Support Node (not depicted).

In the following description, operations are explained with reference to FIG. 5.

If the UE 100 makes a request for a service, the SGSN or the MME, which corresponds to a control entity in the core network, judges whether a data of the service requested by the UE 100 can be diverted onto the wired network 700. In this case, although it is passing through such the wired network 700 as the public network, a provided access point may be identical to that of the mobile communication network 600. In particular, an APN (Access Point Name) indicating a name of the access point is identically used and a SIPTO permit can be separately designated to each APN.

As mentioned in the foregoing description, when the UE 100 performs an access attempt, a specific APN is provided to an entity in the core network. And, the entity in the core network, e.g., the MME 510 of EPS or the SGSN (Serving GPRS Support Node) of UMTS can judge whether the access of the UE 100 is diverted (offload) onto the nodes of the wired network 700 such as the public network. In this case, the control entity in the core network, e.g., the MME 510 can determine whether a data for the requested service is diverted onto the wired network 700 such as the public network in a manner of considering whether an eNode B accessed by the UE 100 is the (e)Node B or the Home (e)Node B and whether the eNode B supports SIPTO.

If the data is determined to be diverted, a session for the data of the service is configured to divert in a manner of passing through the wired network 700. In other word, in order to judge whether the session for the data transceived with the UE 100 is based on a radio section with the source eNode B 300a, e.g., the Home (e)Node B or the wired network with the source local gateway (i.e., the local-GGSN or the local P-GW) 400a, the source MME 510a can check a parameter in the UE context, e.g., a SIPTO_Session_indicator.

In case of providing mobility for the session in progress, it follows a legacy mobility procedure. The source MME 510a determines an appropriate target MME 510b and delivers a UE context to the determined target MME 510b. The source MME may transmit a parameter, e.g., the SIPTO_Session_indicator indicating whether the session in progress is a session based on the SIPTO or may receive the SIPTO_Session_indicator in a manner of inquiring of the HSS, which is a subscriber information server, based on the UE context.

And then, the target MME 510b can determine whether the session based on the SIPTO is maintained in a manner of considering whether the SIPTO is supported by the target eNode B 300b, a service provider policy, a QoS, and the like.

And, in case that the UE moves to coverage of the target eNode B 300b, it may be necessary to change the local P-GW or the local GGSN where the data of the UE 100 is passing through. In this case, it should consider radio access capability, the QoS requested by the session, mobility, and the like.

If the local P-GW or the local GGSN is necessary to be changed, the source MME 510a or the SGSN terminates a current session by delivering the aforementioned reason to the UE 100 and can induce the UE to make a request for a new session. The inducement can be performed by the source MME/SGSN for the source eNode B or the target MME/SGSN for the target eNode B.

In the foregoing description, the architecture proposed by the present specification is explained to provide the SIPTO service via the Home (e)Node B.

In the following description, basic procedures to provide the SIPTO service via the Home (e)Node B are explained with reference to FIG. 6.

Figure 6:
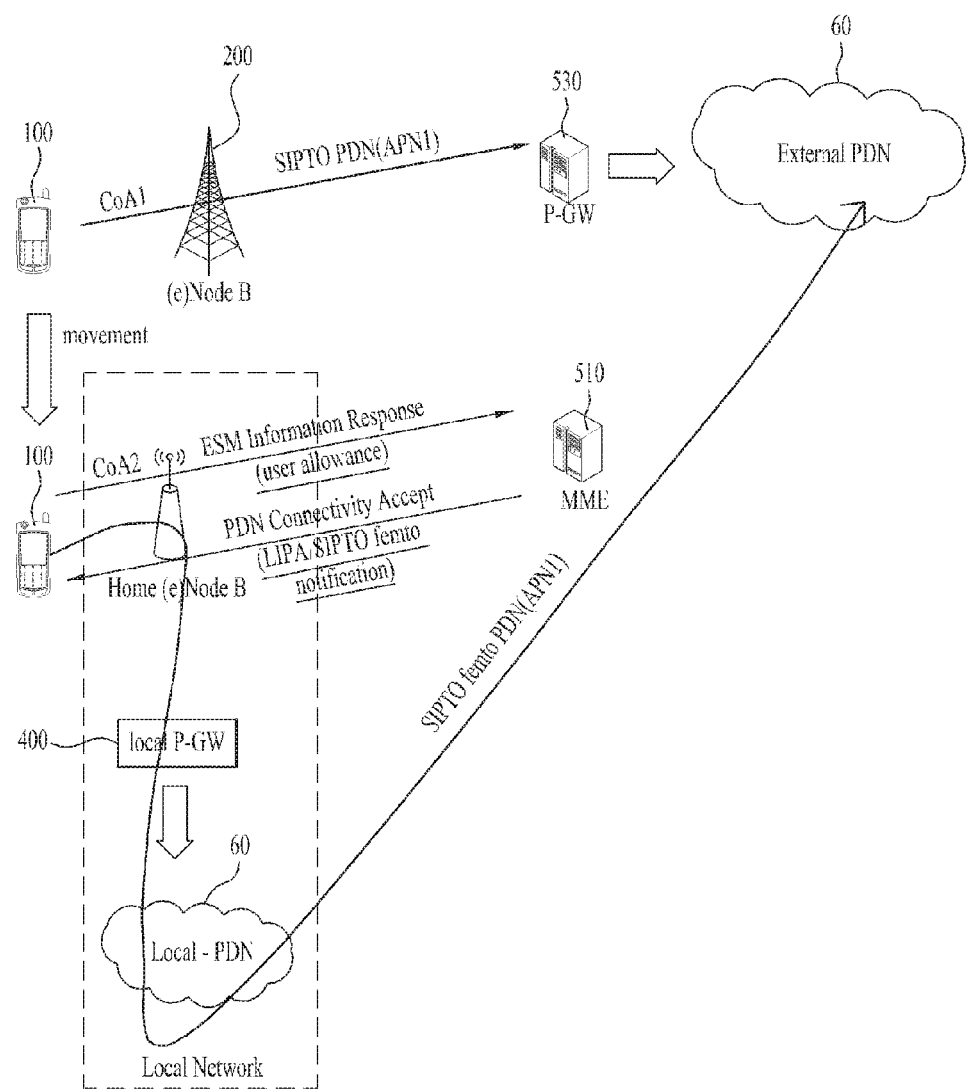
FIG. 6 is an exemplary diagram of a basic procedure to provide a SIPTO service via a Home (e)Node B.

FIG. 6 is an exemplary diagram of a basic procedure to provide a SIPTO service via a Home (e)Node B.

Before starting to explain with reference to FIG. 6, assume that the UE 100 and the entities in the core network support a multiple PDN function, a LIPA, and the SIPTO via a macro base station, i.e., an (e)Node B.

When the UE 100 accesses the macro base station, i.e., the (e)Node B 200, a traffic is passing through an external network via a macro SIPTO, i.e., the P-GW 530 in the core network. If the UE moves to the Home (e)Node B 300, a traffic may pass through the external network via a femto SIPTO, i.e., a local network.

As mentioned earlier, when the UE moves to the Home (e)Node B 300, it may be preferable to ask a user whether the user accepts or agrees that the traffic is passing through the external network via the femto SIPTO, i.e., local network.

Hence, the MME 510 can determine whether a PDN path is configured again for the femto SIPTO according to whether the user accepts or agrees. And, it is necessary to check whether a purpose of use of the PDN configured again is for the LIPA (e.g., a home network data), the SIPTO (e.g., an internet data), or both the SIPTO and the LIPA.

Detail procedures are explained in the following description with reference to FIG. 6.

0) First of all, the UE 100 accesses the macro base station, i.e., the (e)Node B 200 and the macro SIPTO is applied to the data of the UE. In particular, the data traffic of the UE is delivered to the external network via the P-GW 530 in the core network.

1) Subsequently, the UE 100 performs an access attempt to the Home (e)Node B 300 by a TAU/RAU procedure or a handover procedure.

2) In this case, the MME 510 determines whether the SIPTO is applied in a manner of considering a type of the Home (e)Node B 300 (closed access mode, open access mode, or hybrid access mode), an address of the L-GW, and whether the SIPTO/LIPA is allowed. If it is determined that the SIPTO femto is not applied, the MME performs a gateway selection process.

In the following description, decision on whether the SIPTO femto is applied is explained in detail.

First of all, since the UE 100 has accessed the Home (e)Node B 300, the present invention judges whether the LIPA or the SIPTO is available. If the SIPTO is available, the present invention can additionally judge whether the SIPTO femto is available.

First of all, the MME 510 can be aware of whether the LIPA or the SIPTO is available (capability information) via a delivered L-GW address. The MME 510 can additionally judge whether the LIPA or the SIPTO is available in a manner of considering a type of the Home (e)Node B. The MME can support the LIPA or the SIPTO in case that the Home (e)Node B operates in a hybrid mode in a manner of considering the type of the Home (e)Node B.

Subsequently, whether the SIPTO is available can be judged by 3 kinds of methods as follows. A first method is to use a factor (or an indicator) indicating whether the SIPTO is permitted, e.g., SIPTO permission and a factor (or an indicator) indicating whether the LIPA is permitted, e.g., LIPA permission. If both the SIPTO and the LIPA are confirmed as permitted via the two indicators, it can be determined as the L-GW exists in the Home (e)Node B 300 where the UE 100 has accessed and then the SIPTO femto is permitted. A second method is to use a dedicated factor (or an indicator) indicating whether the SIPTO femto is permitted, i.e., a SIPTO femto permission factor. A third method is to use Allowed, Prohibited, and SIPTO femto allowed as an attribute value of a factor (or an indicator) indicating whether the SIPTO is permitted, e.g., SIPTO permission.

The first method is explained in detail in the following description.

The SIPTO permission and the LIPA permission have values as follow.

SIPTO permission: Allowed, Prohibited

LIPA permission: LIPA-prohibited, LIPA-only and LIPA-conditional

Hence, it is able to judge whether the SIPTO femto is permitted in a manner of combining the SIPTO permission and the LIPA permission.

In particular, if the values capable of being possessed by the two factors are combined, a total of 6 combinations are generated. A part of the combinations can be determined as a factor indicating whether the SIPTO femto is permitted.

Meanwhile, in case that whether the SIPTO femto is permitted is judged by combining the SIPTO permission and the LIPA permission, there exist a merit in that a new factor is not necessary to be added but it is also hard to apply according to each PDN.

Hence, the second method is described in the following description.

If a PDN is classified according to a purpose of use, the PDN can be classified into a service provider PDN such as an IMS and the like, an enterprise PDN, a home network PDN, an internet PDN, and the like. In this case, if whether the SIPTO is permitted is judged by combining the SIPTO permission and the LIPA permission as mentioned in the first method, it is difficult for the enterprise PDN to configure not to permit the SIPTO femto due to many reasons such as a security and the like but to permit a normal SIPTO.

Hence, it may be preferable to have a separate SIPTO femto permission as shown in Table 1.

TABLE 1

|  | SIPTO permissions | LIPA permissions | SIPTO femto permissions |
|---|---|---|---|
| Operator PDN (IMS) | allowed | LIPA-prohibited | prohibited |
| Enterprise PDN | prohibited | LIPA-conditional | prohibited |
| Home network PDN | prohibited | LIPA-only | prohibited |
| Internet PDN | allowed | LIPA-prohibited | allowed |

As shown in Table 1, if a dedicated factor indicating whether the SIPTO femto is permitted, i.e., the SIPTO femto permission is used, whether the normal SIPTO is permitted can be differentiated from whether the SIPTO femto is permitted according to each PDN. In Table 1, the internet PDN permits both the SIPTO macro and the SIPTO femto and the operator PDN permits only the SIPTO macro.

Meanwhile, the third is to use Allowed, Prohibited, and SIPTO femto allowed as an attribute value of a factor (or an indicator) indicating whether the SIPTO is permitted, e.g., SIPTO permission.

TABLE 2

|  | SIPTO permissions | LIPA permissions |
|---|---|---|
| Operator PDN (IMS) | Allowed | LIPA-prohibited |
| Enterprise PDN | prohibited | LIPA-conditional |
| Home network PDN | prohibited | LIPA-only |
| Internet PDN | Allowed SIPTO femto allowed | LIPA-prohibited |

As shown in Table 2, the third method is to use Allowed, Prohibited, and SIPTO femto allowed as an attribute value of a factor (or an indicator) indicating whether the SIPTO is permitted, e.g., SIPTO permission without adding the dedicated factor indicating whether the SIPTO femto is permitted, i.e., the SIPTO femto permission.

3) Meanwhile, referring to FIG. 6 again, if it is determined that the femto SIPTO is applied, the MME 510 inquires of a user whether the user accepts or agrees that a traffic of the user is transmitted in a manner of passing through a local network.

Specifically, in order for the MME 510 to ask whether the user accepts or agrees that the traffic of the user is transmitted in a manner of passing through a local network, the MME transmits an information request message, e.g., an ESM information request message to the UE 100. The information request message, e.g., the ESM information request message can include an indicator asking for a request of whether the SIPTO femto is accepted or agreed, e.g., a Request for allowance for SIPTO femto. To ask for the user whether the SIPTO femto is accepted or agreed is because QoS (Quality of service) may not be secured in case that the traffic of the user is transmitted in a manner of being diverted onto the local network.

The UE 100 transmits an information response message, e.g., an ESM Information Reply message. The information response message, e.g., the ESM Information Reply message includes a response received from the user in response to whether the SIMTO femto is accepted or agreed or may include a pre-stored response in response to whether the SIMTO femto is accepted or agreed.

Meanwhile, a process of inquiring of the UE 100 by the MME 510 can be omitted. For instance, the response of the user for whether the user has accepted or agreed can be stored in the subscriber information server, e.g., the HSS. This is a method that an operator or a server manager inquires of the user whether the user has accepted or agreed in advance and stores a result of the inquiry in the subscriber information. This is the method of recording whether the user has accepted or agreed without inquiring of the UE and the method of recording without interaction with the UE. If an intention of the user changes, a change can be stored in the HSS on a timing point of the change.

As mentioned in the foregoing description, instead of omitting the process of inquiring of the UE 100, a process of obtaining the information on whether the user has accepted or agreed by the MME 510 from the HSS can be added. The process of obtaining can be performed via a message based on a protocol between the MME 510 and the HSS, e.g., an Insert Subscriber Data procedure.

4) If the UE 100 transmits information on whether the user allows or not (e.g., ESM information) according to an immediate response of the user or a preconfigured response of the user, the MME 510 determines whether a femto SIPTO function is activated based on the information on whether the user allows or not. In particular, if a response of the user corresponds to a rejection, the MME 510 performs a gateway selection process.

5) Yet, if the response of the user corresponds to an acceptance or agreement, the MME 510 deactivates a PDN connection, which is passing through the (e)Node B and active.

6) Meanwhile, the UE 100 makes a request for a configuration of a new PDN connection by using an identical PDN.

7) The MME 510 asks the L-GW 400 to activate a new PDN connection passing through the Home (e)Node B.

8) If a new PDN connection is generated, the MME 510 informs the UE 100 of a PDN connection acceptance or agreement and notifies the UE 100 that at least one of the SIPTO and the LIPA is available. This notification makes the UE 100 request the LIPA later. Having received the notification, the UE 100 can distinguish whether the generated PDN is designed for the LIPA, the SIPTO, or both the LIPA and the SIPTO. The UE can select a path to which each of IP packets is transmitted based on the notification.

In particular, although the UE can know a state of access of the Home (e)Node B, the UE cannot know whether the L-GW supports, i.e., whether the generated PDN supports the SIPTO femto or the LIPA. Hence, the notification is additionally necessary to know whether a support is available.

Hence, there are two types of methods for notifying the UE of whether the SIPTO femto or the LIPA is supported.

A first method is to independently use a notification for informing whether a support of the SIPTO femto is available and a notification for informing whether a support of the LIPA is available, respectively. A second method is to use one notification for indicating whether the support of the SIPTO femto is available and whether the support of the LIPA is available.

First of all, the first method is explained in the following description.

If only the notification for informing whether the support of the LIPA is available is delivered from the MME 510, the UE 100 can know that it is the LIPA PDN and transmits a data related to a local IP access such as a related home network and the like only. Meanwhile, If only the notification for informing whether the support of the SIPTO is available is delivered from the MME 510, the UE 100 can know that it is the PDN for the SIPTO. In this case, since the UE 100 does not receive the notification for LIPA permission, it should not be transmitted the data heading to the local network. In particular, to deliver only the notification for informing whether the support of the SIPTO is available to the UE 100 can be used only when a data heading to an external network such as the internet is allowed in a manner of performing a transmission control according to a purpose. Meanwhile, both the notification for informing whether the support of the LIPA is available and the notification for informing whether the support of the SIPTO is available can be delivered from the MME 510 to the UE 100.

A second method is described. The MME 510 delivers the notification for informing whether the support of the LIPA is available to the UE 100. As mentioned earlier, if the UE receives only the notification for informing whether the support of the LIPA is available, the UE 100 judges whether the generated PDN is designed for the LIPA or the SIPTO. If the generated PDN is designed for the SIPTO, the UE interprets the content of the notification as the SIPTO is supported. On the contrary, if the generated PDN is designed for the LIPA, the UE interprets the content of the notification as the LIPA is supported.

Meanwhile, the two types of the methods can be summarized according to the aforementioned factor (or indicator) for indicating whether the SIPTO is permitted, e.g., SIPTO permission and the factor (or indicator) for indicating whether the LIPA is permitted in the following description.

First of all, in case that the Home (e)Node B supports the L-GW, a method of independently using the notification for informing the support of the SIPTO femto and the notification for informing the support of the LIPA according to the combination of the factor (or indicator) for indicating whether the SIPTO is permitted, e.g., SIPTO permission and the factor (or indicator) for indicating whether the LIPA is permitted is summarized in Table 3 as follows.

TABLE 3

| | | LIPA permission | | |
|---|---|---|---|---|
| | | LIPA only | LIPA-conditional | LIPA-prohibited |
| SIPTO permission | Allowed prohibited | SIPTO femto + LIPA LIPA | SIPTO femto + LIPA LIPA | SIPTO femto LIPA |

Subsequently, in case that the Home (e)Node B does not support the L-GW, a method of independently using the notification for informing the support of the SIPTO femto and the notification for informing the support of the LIPA according to the combination of the factor (or indicator) for indicating whether the SIPTO is permitted, e.g., SIPTO permission and the factor (or indicator) for indicating whether the LIPA is permitted is summarized in Table 4 as follows.

TABLE 4

| | | LIPA permission | | |
|---|---|---|---|---|
| | | LIPA only | LIPA-conditional | LIPA-prohibited |
| SIPTO permission | Allowed prohibited | SIPTO macro X | SIPTO macro PDN to core network | SIPTO macro X |

First of all, in case of the LIPA, a PDN can be generated in case of LIPA-conditional. Yet, the PDN may correspond to the PDN designed for the LIPA or a path transmitted to the core network according to whether the L-GW is supported. Hence, in case that the L-GW is supported, a notification for informing that the PDN corresponds to the LIPA PDN is necessary. In case of the SIPTO, since the PDN is generated by the request of the MME 510, it is able to notify whether the SIPTO is permitted. In this case, it is necessary to distinguish the notification for which one is permitted among a SIPTO macro and a SIPTO femto according to its application.

And, there may exist a case of occurrence that one PDN supports both the SIPTO macro and the SIPTO femto or a case of occurrence that both the SIPTO macro and the SIPTO femto should not be permitted. In those cases, it is able to determine according to the aforementioned combination as well.

In summary, in case of making a request for the LIPA notification and the SIPTO or in case of completing SIPTO PDN configuration (in case of femto or macro), a notification can be provided using an indicator/cause value.

Meanwhile, in case that the Home (e)Node B supports the L-GW, if a dedicated factor or an indicator for indicating that the SIPTO femto is permitted, i.e., a SIPTO femto permission factor is used, a method of independently using the notification for informing the support of the SIPTO femto and the notification for informing the support of the LIPA is summarized in Table 5 as follows.

TABLE 5

| | | LIPA permission | | |
|---|---|---|---|---|
| | | LIPA only | LIPA-conditional | LIPA-prohibited |
| SIPTO permission | Allowed prohibited | SIPTO femto + LIPA LIPA | SIPTO femto + LIPA LIPA | SIPTO femto X |

Meanwhile, in case that the Home (e)Node B does not support the L-GW, if a dedicated factor or an indicator for indicating that the SIPTO femto is permitted, i.e., a SIPTO femto permission factor is used, a method of independently using the notification for informing the support of the SIPTO femto and the notification for informing the support of the LIPA is summarized in Table 6 as follows.

TABLE 6

| | | LIPA permission | | |
|---|---|---|---|---|
| | | LIPA only | LIPA-conditional | LIPA-prohibited |
| SIPTO permission | Allowed prohibited | SIPTO macro SIPTO macro | SIPTO macro SIPTO macro | SIPTO macro SIPTO macro |

Referring to Table 5, in case of supporting the L-GW, it operates identically to Table 3 irrespective of the SIPTO permission. In case of not supporting the L-GW, only the SIPTO macro is generated according to the SIPTO permission. Hence, although Table 6 is different from Table 4, in summary, in case of making a request for the LIPA notification and the SIPTO or in case of completing SIPTO PDN configuration (in case of femto or macro), a notification can be provided using an indicator/cause value.

In the foregoing description, it is explained in a manner of centering on the procedure with reference to FIG. 6. In the following description, informations required to perform each procedure are mainly explained.

1. Subscriber Information

It is the information recorded in the aforementioned HSS or the HLR.

The subscriber information recorded in the HSS or the HLR is delivered to the MME 510. The subscriber information should include such information shown in Table 7 as CSG subscriber information, information on whether the LIPA is allowed in a visited network, information on SITP permission according to each PDN, information on whether the LIPA is permitted (LIPA permission), information on SIPTO femto permission, and information on whether a user permits.

TABLE 7

Subscriber information (subscription)

1) CSG subscription data (subscription data) CSG IDs (APN) 2) VPLMN LIPA Allowed 3) each PDN—SIPTO permission—whether the LIPA is permitted (LIPA permission): LIPA-prohibited, LIPA-only, LIPA-conditional—whether the SIPTO femto is permitted (permission)—User Allowance for SIPTO femto: acceptance, decline As mentioned in the foregoing description, referring to Table 7, since the SIPTO can be permitted although the LIPA is not permitted, the SIPTO permission and whether the LIPA is permitted (LIPA permission) can be used separately. And, the SIPTO femto permission can be additionally used. Alternatively, the SIPTO femto allowed can be added as an attribute value of the SIPTO permission without the SIPTO femto permission.

Meanwhile, in case that the information on the acceptance or agreement of the user is included in the subscriber information, since the MME 510 does not inquire of the UE 100 and can judge the agreement of the user based on the information from the HSS, it is able to perform a prompter processing.

2. Capability of the Home (e)Node B

Capability information on whether the Home (e)Node B 300 supports the LIPA and the SIPTO should be provided to the MME 510. In this case, the L-GW is necessary to support the LIPA and the SIPTO.

In this case, the L-GW may be included in the Home (e)node B 300 or may be physically independent from the Home (e)Node B 300.

First of all, in case that the L-GW operates in a manner of being included in the Home (e)Node B 300, the capability information on whether the SIPTO is supported can be known in a manner of delivering the address of the L-GW. In this case, in order to distinguish between whether a function of the LIPA is supported and whether a function of the SIPTO is supported, both a SIPTO capability indicator and a LIPA capability indicator are delivered together. These are additional informations necessary when the MME intends to process each of the functions in a manner of distinguishing each of the functions.

Subsequently, in case that the L-GW is physically independent from the Home (e)Node B 300, since the Home (e)Node B may not know the address of the L-GW, it is not able to transmit with an address form only. Yet, each of the SIPTO capability and the LIPA capability can be delivered by the configuration of an operator or an owner of the Home (e)Node B. In particular, if the SIPTO capability and the LIPA capability are delivered by the address of the L-GW, a name of a FQDN form, a separate indicator, or the like, it is able to inform the MME of whether the support is available. Or, the MME may find out whether the support is available in a manner of directly searching for the L-GW using information on location, and the like.

In both cases, it is able to commonly judge whether the support is available in consideration of a type of the Home (e)Node B. In case that the Home (e)node B operates in the hybrid mode, it is able to support the LIPA or the SIPTO without a CSG subscription in a manner of considering the type of the Home (e)node B.

3. LIPA Notification

According to the requirements defined in 3GPP SA 1 standard specification, the Home (e)Node B can inform the UE that the Home (e)Node B provides an access with an IP network of a home/enterprise network. This can be delivered to the UE before the UE attaches itself to a network or after the UE attached itself to the network.

In case that before the UE attaches itself to the network, it is called broadcasting. In this case, the UE 100 can deliver SIPTO acceptance or decline information. This sort of information of the UE can be stored in advance. Or, depending on broadcasting information, if the UE inquires of a user and receives permission from the user, the UE can transmit the broadcasting information.

When the UE completes the attachment, it is able to deliver with a NAS or an AS message. The UE 100 additionally delivers the SIPTO acceptance or the decline information in accordance with the present information. Or, the UE can be aware that a PDN generated based on the present information and permission informations of context information is configured as a local network.

Figure 7:
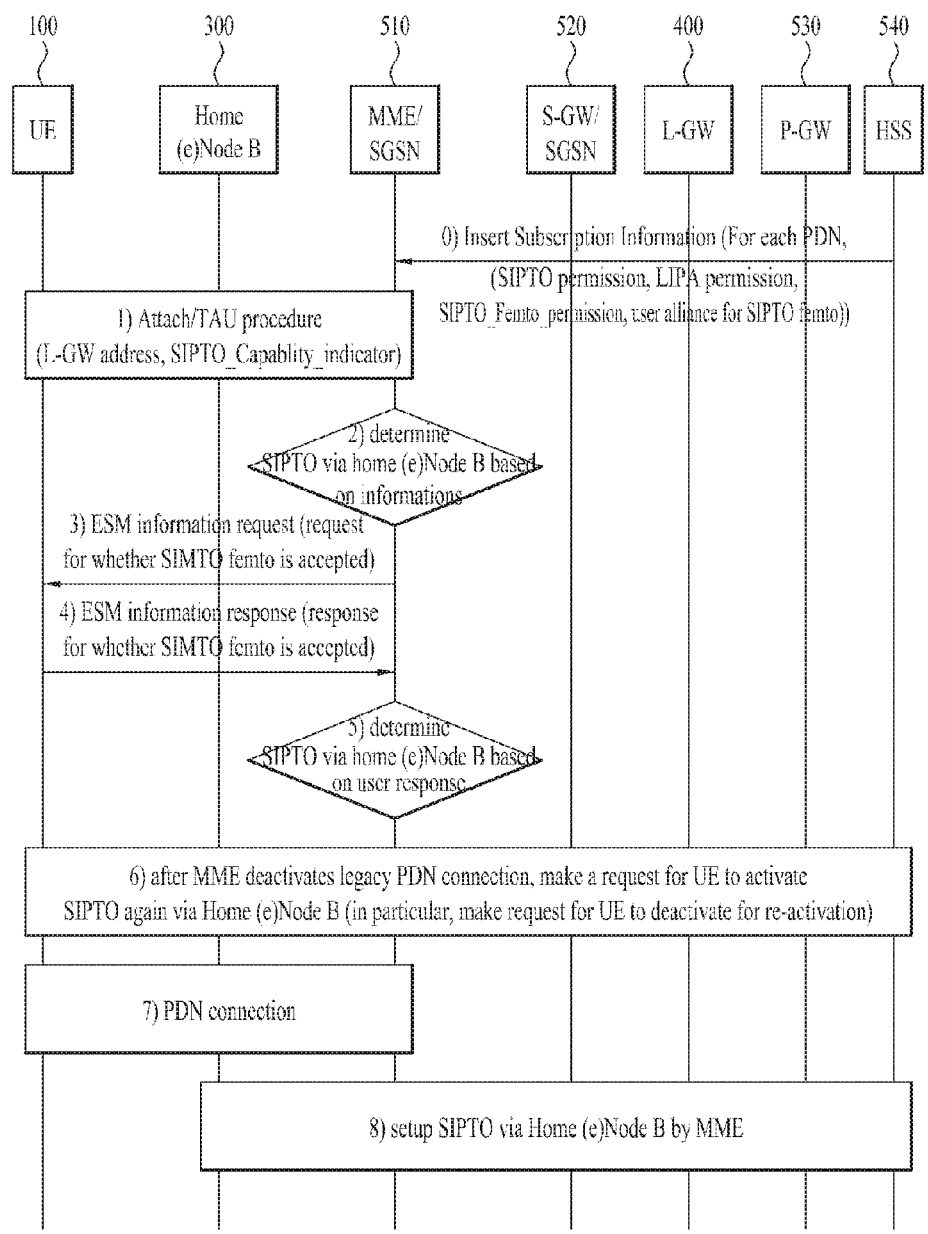
FIG. 7 is a flowchart briefly showing a control procedure to provide a SIPTO service of the present invention.
Figure 8:
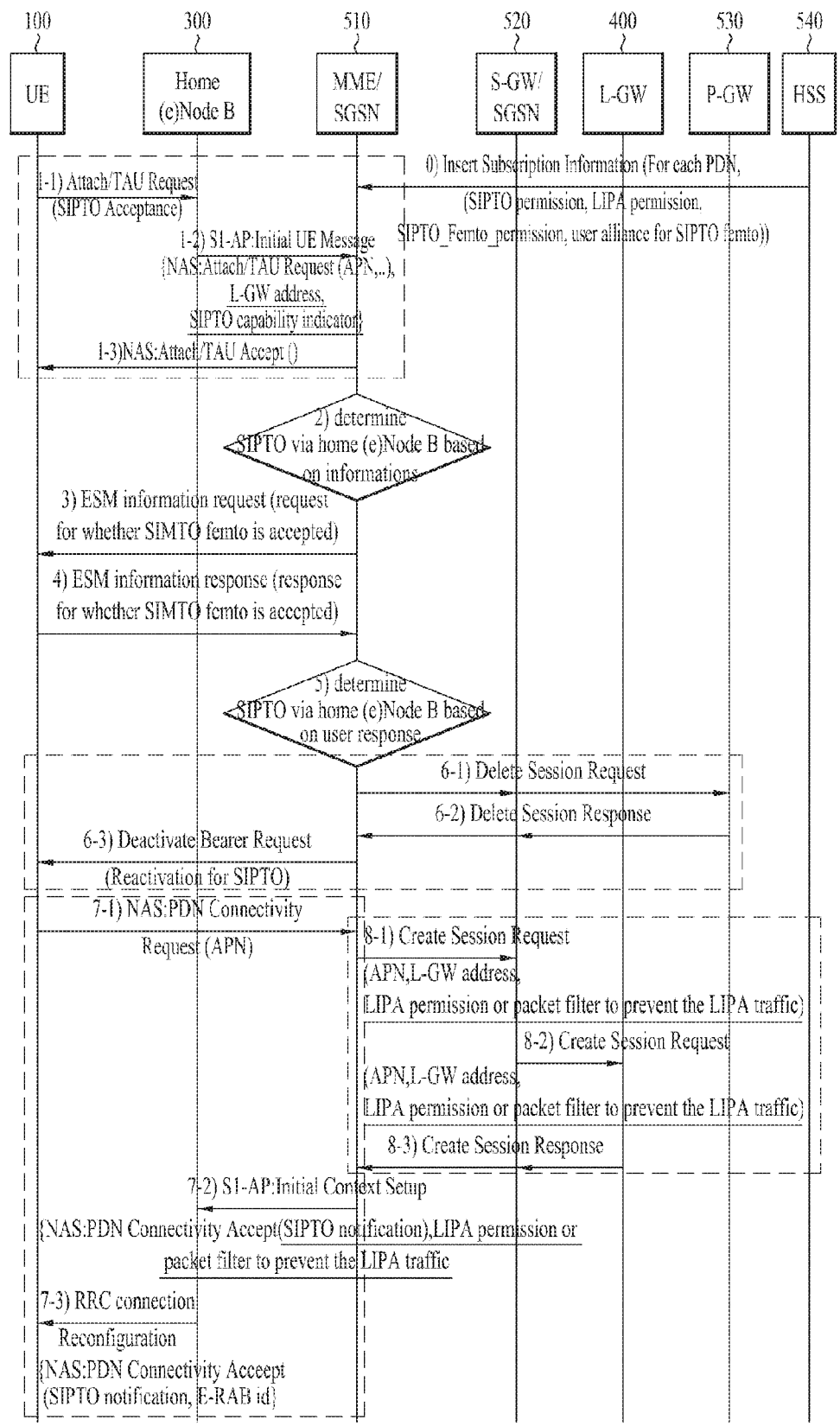
FIG. 8 is a flowchart of a more detail procedure of the procedure depicted in FIG. 7.
Figure 9:
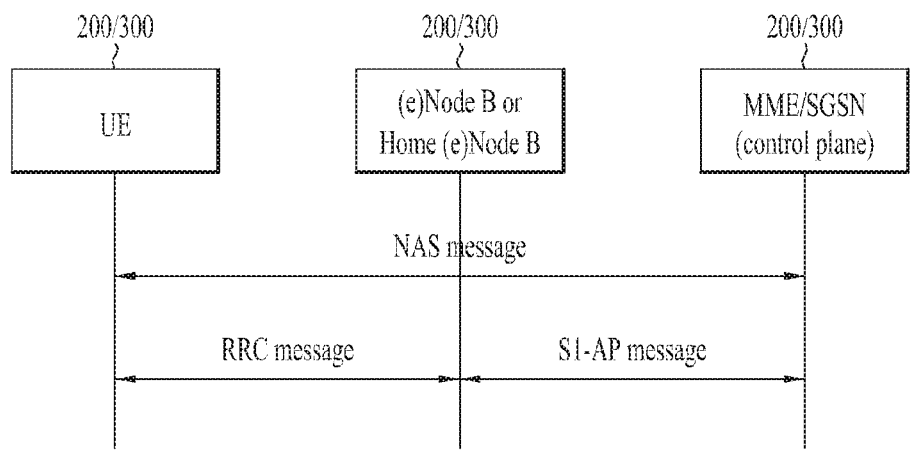
FIG. 9 is an exemplary diagram of a message protocol depicted in FIG. 8.

FIG. 7 is a flowchart briefly showing a control procedure to provide a SIPTO service of the present invention. FIG. 8 is a flowchart of a more detail procedure of the procedure depicted in FIG. 7. FIG. 9 is an exemplary diagram of a message protocol depicted in FIG. 8.

Prior to starting to explain each procedure in detail with reference to FIG. 7 and FIG. 8, depicted messages are briefly explained with reference to FIG. 9 in the following description.

The messages transceived between the UE 100 and the base station, e.g., an (e)Node B 200 or a Home (e)Node B 300 are the messages based on an RRC (Radio Resource Control) protocol. The messages transceived between the base station, e.g., the (e)Node B 200 or the Home (e)Node B 300 and the MME 510 or the SGSN (not depicted) are the messages based on S1-AP (S1 Application Protocol).

The messages transceived between the UE 100 and the MME 510 or the SGSN (not depicted) are the messages based on a NAS (Non-Access Stratum) protocol. The messages based on the NAS protocol are transmitted in a manner of being capsuled into the message based on the RRC protocol and the message based on the S1-Ap message, respectively.

Prior to starting to explain the control procedure depicted in FIG. 7 and FIG. 8, a parameter in the depicted message is briefly summarized in the following description.

SIPTO acceptance: it indicates whether a SIPTO service is accepted, agreed, or rejected.

L-GW address: it is an address of a local gateway and indicates whether the Home (e)Node B is able to provide the SIPTO service (SIPTO capability) as well. In particular, if the address of the local gateway is included in the message transmitted by the Home (e)Node B, it means that the Home (e)node B is able to provide the SIPTO service.

SIPTO capability indicator: it is an indicator of a SIPTO function and can indicate whether the SIPTO service is provided.

SIPTO permission: it is an authority for a SIPTO service and indicates whether the SIPTO service is allowed.

LIPA permission: it is an authority for a LIPA service and indicates whether the LIPA service is allowed.

SIPTO femto permission: it is an authority for a SIPTO service via the Home (e)Node B and indicates whether the SIPTO service is allowed via the Home (e)Node B.

User Allowance: it indicates whether a user accepts or agrees a use of a SIPTO service via the Home (e)Node B.

LIPA notification: it is a notification for a LIPA service and indicates whether the LIPA service is allowed.

Packet filter: as information delivered from the MME 500 to the Home (e)Node B or a local gateway, in case that the traffic of the UE 100 is heading to a small scale network, e.g., a home network or an enterprise network, it is a filter for blocking or passing the traffic.

In the following description, it shall be explained in detail with reference to FIG. 7 and FIG. 8.

0) First of all, referring to FIG. 7, the MME 510 obtains subscriber information of the UE 100 from the depicted HSS 540. The subscriber information of the UE 100 may be differently configured according to each PDN. The subscriber information configured in each PDN unit can include at least one selected from the group consisting of information on the aforementioned SIPTO permission, information on the LIPA permission (whether the LIPA is permitted), information on the SIPTO femto permission, information on whether a user of the UE accepts or agrees the SIPTO femto service.

1) Subsequently, referring to FIG. 7, the UE 100 performs an attach procedure, a TAU procedure, or a handover procedure to access the Home (e)Node B 300.

1-1) specifically, referring to FIG. 8, the UE 100 is in an idle mode and generates an area update request message (e.g., a TAU request message) to request a TAU (Tracking Area Update). The message can include an APN for indicating a name of an access point, which is supposed to be received by the UE 100. And, the UE 100 encapsulates the area update request message, i.e., the TAU request message in a message based on an RRC protocol and transmits the capsulated message to the (e)Node B 200 or the Home (e)node B 300. The attach request message may include SIPTO acceptance information indicating the information on whether a user of the UE 100 accepts or agrees a SIPTO service.

1-1) Having received the RRC message from the UE 100, the Home (e)node B 300 extracts the area update request message included in the RRC message, i.e., the TAU request message. And, the Home (e)node B 300 transmits a connection request message, i.e., an initial message (e.g., an initial UE message) to the MME 510 in a manner of adding at least one of an address of a local gateway (L-GW address) and a SIPTO function indicator together with the extracted message. The connection request message, i.e., the initial message is based on S1-AP. The initial message may correspond to an initial UE message as depicted in FIG. 8.

The connection request message, i.e., the initial message may further include information on the Home (e)Node B, e.g., CSG ID, information on a function of the Home (e)Node B, LIPA service function indicator (LIPA capability indicator), SIPTO service function indicator (e.g., SIPTO capability indicator), or the like. In this case, in case of the Home (e)Node B 300, since the Home (e)Node B is able to support both the LIPA and the SIPTO or may support one of them only, the aforementioned two indicators can be included in the initial message or one of the indicators can be included in the initial message only. In particular, if both the LIPA and the SIPTO are supported, the aforementioned two parameters are included in the initial message.

If the MME 510 (or SGSN in case of UMTS) receives the connection request message, i.e., the initial message, the MME extracts the area update request message, i.e., the TAU request message (attach request) from the connection request message, i.e., the initial message. And, the MME extracts an indicator or information included in the connection request message, i.e., the initial message. The MME 510 stores the extracted indicator or the information.

And, the MME 510 (or the SGSN in case of UMTS) transmits an area update acceptance or agreement message, e.g., a TAU Accept message to the UE 100 via the Home (e)Node B 300. Specifically, the MME 510 (or the SGSN in case of UMTS) encapsulates the area update acceptance or agreement message, e.g., the TAU Accept message based on the S1-AP protocol and delivers it to the Home (e)Node B 300. And, the Home (e)Node B 300 extracts the area update acceptance or agreement message, e.g., the TAU Accept message from the encapsulated message and delivers the extracted message to the UE 100 in a manner of encapsulating the extracted message according to the RRC protocol.

Although the aforementioned 1) process is explained centering on the TAU procedure as an example, it can be modified into an RAU (Radio Area Update) procedure, a handover procedure, or an attach procedure. In case that the aforementioned 1) process is modified into the RAU procedure, the message transmitted by the UE 100 may correspond to an RAU request message. In case that the aforementioned 1) process is modified into the handover procedure, the message transmitted by the UE 100 may correspond to a handover request message. Or, in case that the aforementioned 1) process is modified into the attach procedure, the message transmitted by the UE 100 may correspond to an attach request message. Since the aforementioned RAU, handover, or the attach procedure can be easily implemented by those skilled in the art understood the present specification, the RAU, handover, or the attach procedure is not explained in detail.

2) Subsequently, referring to FIG. 7, the MME 510 (or the SGSN in case of UMTS) determines whether the SIPTO is applied via the SIPTO femto, i.e., the Home (e)Node B based on the informations received via the RAU, handover, or the attach procedure.

Specifically, the MME 510 (or the SGSN in case of UMTS) can determine whether the SIPTO femto service is provided to the UE 100 based on at least one of the subscriber information, the stored information, or the indicator. In particular, the MME 510 can determine whether a PDN connection of the UE 100 is configured to pass through a path of the node within the Home (e)Node B 300 and the wired network 700.

Specifically, if at least one of address information of the local gateway and the SIPTO function indicator is included in the TAU request message, the MME 510 judges that the Home (e)Node B is able to provide the SIPTO service.

In particular, the MME judges that the Home (e)Node B is able to provide the SIPTO service in a manner of considering at least one of the address information (i.e., an identifier) of the local gateway and the SIPTO service-related indicator.

By doing so, in case that the Home (e)Node B is able to provide the SIPTO service, the MME 510 judges whether it is possible to apply the SIPTO for a data of the UE based on the APN.

To this end, the MME 510 may further consider a service provider policy. And, the MME 510 may consider QoS of a bearer required by the UE. Specifically, if QoS of the bearer configured to pass through the path of the node within the wired network such as the public network satisfies the QoS required by the UE, the MME 510 can determine that the SIPTO service is provided to the UE.

Meanwhile, the MME 510 can additionally determine whether a LIPA service is provided to the UE 100 based on at least one of the subscriber information, the stored information, or the indicator.

And, it is able to consider whether the UE 100 is a CSG member of the Home (e)Node B. Information on the CSG membership can be included in the subscriber information obtained from the HSS 540.

3) Meanwhile, referring to FIG. 7, if the information obtained from the HSS 540 does not include the SIPTO acceptance or agreement information and the TAU request message does not include the SIPTO acceptance or agreement information, the MME 510 transmits an information request message, e.g., an ESM Information Request message to the UE 100 to inquire of the UE 100 of whether the UE accepts or agrees the SIPTO. The information request message, e.g., the ESM Information Request message can include an indicator, e.g., a Request for allowance for SIPTO femto to ask for whether the SIPTO femto is accepted or agreed.

4) Referring to FIG. 7, the UE 100 transmits an information response message, e.g., an ESM Information Reply message. The information response message, e.g., the ESM Information Reply message may include a response received from a user in response to whether the SIMTO femto is accepted or agreed or may include a pre-stored response in response to whether the SIMTO femto is accepted or agreed.

5) Referring to FIG. 7, if it is confirmed that the user of the UE 100 look forward to receiving the SIPTO femto service according to a result of checking the SIPTO acceptance or agreement information, it is able to determine that the MME 510 provides the SIPTO femto service to the UE 100. Or, although the SIPTO acceptance or agreement information is not included in the TAU request message, if it is confirmed that the UE 100 look forward to receiving the SIPTO femto service by the obtained subscriber information, it is able to determine that the MME 510 provides the SIPTO femto service to the UE 100.

6) According to the aforementioned decision, if it is determined that a bearer of the UE is processed by the SIPTO femto service (in other word, if it is determined that the bearer of the UE is configured to pass through a path of the nodes in the wired network 700 such as the public network), as shown in FIG. 7, the MME 510 deactivates a legacy PDN connection and then makes a request for the UE 100 to activate the SIPTO again via the Home (e)Node B (in particular, makes request for the UE to deactivate for re-activation).

6-1) specifically, referring to FIG. 8, the MME 510 transmits a session delete request message, e.g., Delete Session Request message to a serving gateway (S-GW) 520 or an SGSN to delete a session configured between the core network, e.g., the serving gateway (S-GW) 520 or the SGSN and a PDN gateway (P-GW) 530. Having received the session delete request message, the serving gateway (S-GW) 520 or the SGSN delivers the session delete request message to the PDN gateway (P-GW) 530.

6-2) The PDN-gateway (P-GW) 530 delivers a response message, e.g., a Delete Session Response message to the serving gateway (S-GW) 520 or the SGSN and the serving gateway (S-GW) 520 or the SGSN delivers the response message, e.g., the Delete Session Response message to the MME 510 or the SGSN.

6-3) subsequently, the MME 510 delivers a bearer deactivation request message to the UE to reactivate (deactivation with reactivation) the bearer for the SIPTO after the bearer is deactivated. The bearer deactivation request message may include an indicator, e.g., Reactivation for SIPTO indicating reactivation for a cause value, e.g., the SIPTO.

7-8) referring to FIG. 7, the UE 100 performs a PDN connection and the MME configures the SIPTO via the Home (e)Node B.

7-1) specifically, referring to FIG. 8, the UE 100 a PDN connection request message to the MME 510. The PDN connection request message includes an APN for indicating a name of an access point, which is supposed to be received by the UE 100. In this case, the UE 100 can include a PDN (APN) identical to the PDN (APN) for a normal service in the PDN connection request message.

8-1) subsequently, the MME 510 transmits a session generation request message, e.g., a Create Session request including the APN and an address (L-GW Address) of the local gateway (L-GW) to the serving gateway (S-GW) 520 to generate the PDN connection for the SIPTO.

Meanwhile, in case that the MME 510 determines whether a LIPA service is provided to the UE 100 based on at least one of the subscriber information, the stored information, or the indicator in the aforementioned process, the MME can include a LIPA permission (whether the LIPA is permitted) or a packet filter information in the session generation request message according to the decision. In particular, if it is determined that the LIPA service is provided to the UE 100, the MME 510 can include the LIPA permission in the session generation request message. If it is determined that the LIPA service is not provided to the UE 100, the MME 510 does not include the LIPA permission in the session generation request message and can include the packet filter information in the session generation request message only.

Alternatively, in case that it is not determined whether the LIPA service is provided to the UE 100 in the aforementioned process, if the MME receives the PDN connection request message from the UE 100, the MME may determine whether the LIPA service is provided to the UE 100.

8-2) Having received the session generation request message, the serving gateway (S-GW) 520 checks a parameter, e.g., an address of a local gateway in the session generation request message. If there exist the parameter, e.g., the address of the local gateway, the serving gateway (S-GW) delivers the session generation request message to the local gateway (L-GW) 400.

In this case, the local gateway (L-GW) 400 checks whether there exist at least one of the LIPA permission or the filter information in the session generation request message. In case that the LIPA permission is included in the session generation request message, if a data received from the UE 100 is heading to a small scale network, e.g., a home network or an enterprise network, connected to the local gateway (L-GW) 400, the local gateway allows the data to be passed. Yet, in case that the LIPA permission is not included in the session generation request message or the filter information is included in the session generation request message, if a data received from the UE 100 is heading to a small scale network, e.g., a home network or an enterprise network, connected to the local gateway (L-GW) 400, the local gateway can block the data.

8-3) The local-gateway (L-GW) 400 delivers a session generation response message, e.g., a Create Session Response message to the serving gateway 520 and the serving gateway delivers the session generation response message to the MME 510.

7-2) Meanwhile, having received the session response message, the MME 510 generates a connection acceptance or agreement message (e.g., a Connectivity Accept message). The generated message may be based on a NAS protocol. In this case, the MME 510 determines whether the LIPA service is allowed to the UE 100 and can include a notification for the LIPA service in the generated message according to the decision.

Subsequently, the MME 510 encapsulates the generated message in an S1 AP-based initial context setup response message (Initial context Response message). In this case, the MME 510 can include at least one of the LIPA permission and the packet filter information in the initial context setup response message according to the decision on whether the LIPA service is allowed to the UE 100.

Subsequently, the MME 510 transmits the initial context setup response message to the Home (e)Node B 300.

7-3) Having received the initial context setup response message, the Home (e)node B 300 extracts the connection acceptance or agreement message and encapsulates the extracted connection acceptance or agreement message in an RRC connection reconfiguration message.

And, the Home (e)node B 300 can include a part of the parameters situated in the initial context setup response message in the RRC connection reconfiguration message or may include the whole of the parameters in the RRC connection reconfiguration message. And, the Home (e)node B 300 can exclude at least one of the parameters from the received connection acceptance or agreement message or may add one or more parameters or information to the received connection acceptance or agreement message. Referring to FIG. 6 as an example, besides a notification parameter (e.g., LIPA notification) for the LIPA service included in the connection acceptance or agreement message, an E-RAB id parameter is additionally included in the connection acceptance or agreement message.

The Home (e)Node B 300 transmits the RRC connection reconfiguration message to the UE 100.

Meanwhile, the Home (e)Node B 300 stores at least one of the LIPA notification parameter, the LIP permission, or the filter information in a manner of extracting from the connection acceptance or agreement message. And, the Home (e)Node B 300 judges whether the LIPA service is allowed to the UE based on at least one of the LIPA notification parameter and the LIPA permission. If the LIPA service is not allowed to the UE, although a data heading to a small scale network, e.g., a home network or an enterprise network is received from the UE 100, the Home (e)Node B 300 discards or blocks the data. Or, if the Home (e)Node B 300 receives the data heading to a small scale network, e.g., a home network or an enterprise network from the UE 100, the Home (e)Node B 300 blocks or discards the data according to a rule of the filter.

Meanwhile, having received the RRC connection reconfiguration message, the UE 100 can transmit an RRC connection reconfiguration completion message to the Home (e)Node B 300.

And, the UE 100 checks whether there exist the notification parameter (e.g., LIPA notification) for the LIPA service in the RRC connection reconfiguration message. If there exist the notification parameter, the UE checks the notification parameter for the LIPA service. If the LIPA service is not allowed by the notification parameter for the LIPA service, the UE 100 does not generate a data heading to a small scale network, e.g., a home network or an enterprise network via the Home (e)Node B 300. Or, although a data is generated, the UE does not transmit the data.

As mentioned in the foregoing description, although the MME 510 and the S-GW 520 are explained on the basis of the EPC in FIG. 7 and FIG. 8, the concept of the present invention can be applied to UMTS as well. In case of the UMTS, both the MME 510 and the S-GW 520 can be integrated to the SGSN. Hence, a signal transmission and reception between the MME 510 and the S-GW 520 depicted in FIG. 6 is not performed and the signal transmission and reception is processed in the SGSN.

Meanwhile, in the foregoing description, it is explained in a manner of mainly concerning the procedures with reference to drawings. In the following description, operations of each main agent are summarized.

1. UE

The UE provides a SIPTO acceptance/decline to the MME 510. After receiving the present information, the MME determines whether a SIPTO femto is applied in a manner of comparing the information with various decision elements.

Delivery timing of the UE 100 can be performed in response to a reception of the information request message, e.g., an ESM information request message or can be recorded in subscriber information of the HSS 540 according to a request of a service provider.

Table 8 is a summary of the operation of the UE.

TABLE 8

| What the UE 100 transmits to the MME 510—User Allowance for SIPTO femto: Accept, decline |
|---|

Meanwhile, after the SIPTO femto becomes available, the UE 100 performs a data transmission based on a policy. The policy is delivered in advance and stored in the UE 100.

After a new PDN connection is generated, the MME 510 delivers a LIPA or a SIPTO notification to the UE 100. Having received each of the notifications, the UE 100 can distinguish whether the generated PDN is designed for the LIPA, the SIPTO, or for both the LIPA and the SIPTO. The UE can select a path to which each of IP packets should be transmitted based on the distinguished PDN.

2. MME

First of all, the MME 510 determines whether a SIPTO femto is applied. To this end, the MME 510 judges whether the SIPTO femto is applied based on 1. subscriber information, 2. Home (e)Node B (L-GW address, and the like), 3. Information on whether a user accepts or agrees.

In this case, the information on whether a user accepts or agrees can be delivered in a manner that the MME 510 transmits a information request message, e.g., an ESM Information Request.

The timing point of receiving the information on whether a user accepts or agrees by the MME 510 may correspond to the timing point that the UE 100 performs an attachment or the timing point that the attachment or the LIPA is completed. In order to receive the information on whether a user accepts or agrees on the timing point that the attachment or the LIPA is completed, the MME 510 may include an indicator for inquiring of the information on whether a user accepts or agrees in an Attach Accept and a PDN connectivity Accept message.

Meanwhile, the timing point of receiving the information on whether a user accepts or agrees by the MME 510 may correspond to the timing point of determining whether the SIPTO femto is applied. In this case, since the timing point of determining whether the SIPTO femto is applied can be performed after TAU/RAU or in case of a handover, the timing point of receiving the information on whether a user accepts or agrees by the MME 510 may correspond to the timing point after TAU/RAU or in case of a handover.

Meanwhile, the MME 510 can operate a SIPTO PDN and a LIPA PDN in a manner of integrating the SIPTO PDN and the LIPA PDN or separating the SIPTO PDN from the LIPA PDN. A method of separately operating is a method of operating the SIPTO PDN and the LIPA PDN, respectively. In case that the SIPTO PDN and the LIPA PDN are operated by being integrated, if the LIPA PDN already exists, the SIPTO PDN is combined with the LIPA PDN. It is a concept that the SIPTO PDN is absorbed into the LIPA PDN or shared by the LIPA PDN. Consequently, an integrated Context is generated.

Table 9 is a summary of operations of the MME.

TABLE 9

| The MME 510 determines whether the SIPTO femto is applied based on the information in the following description—LIPA/SIPTO capability indicator from the Home (e)Node B—subscriber information—information from the UE: whether a user accepts or agrees<br>Information transmitted by the MME 1) information transmitted to the Home (e)Node B or the L-GW—whether the LIPA is permitted (LIPA permission), or if the LIPA is not permitted, filter information to block LIPA traffic 2) information transmitted to the UE—LIPA notification—SIPTO femto notification—whether the LIPA is permitted (LIPA permission), or if the LIPA is not permitted, the filter information to block the LIPA traffic |
|---|

In this case, there is a point to be specially considered. In case that the LIPA is not provided, although the SIPTO is provided, the L-GW can be assigned just like a case of the LIPA. Hence, the UE can transmit a data to a home network. In particular, since a process of generating a SIPTO session is identical to that of a legacy LIPA, LIPA traffic may be transmitted. Yet, SIPTO traffic should be transmitted only and the LIPA traffic should be dropped or blocked. To this end, the MME 510 performs a control function to block or deliver the traffic delivered to the corresponding network in a manner of transmitting an indicator indicating that the LIPA is not permitted to the Home (e)Node B or the L-GW or in a manner of delivering the filter information (target IP address and the like), CSG id, APN, and the like to the Home (e)Node B or the L-GW.

3. Home (e)Node B

Table 10 is a summary of operations of the Home (e)Node B.

TABLE 10

Figure 10:
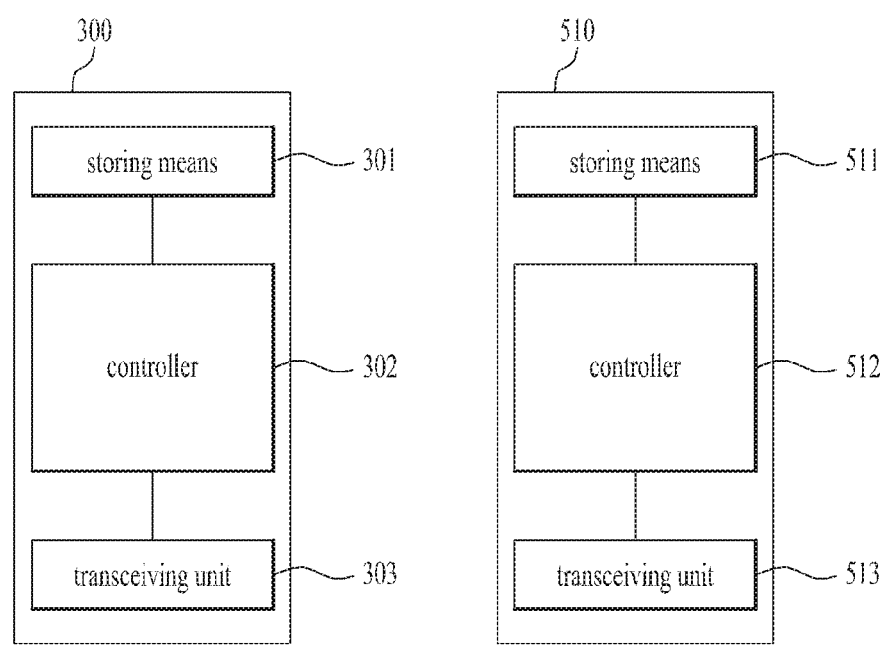
FIG. 10 is a block diagram of a Home (e)Node B 300 and an MME 510 according to the present invention.

What the Home (e)Node B transmits to the MME 530—L-GW address—SIPTO capability indicator
What the MME 530 transmits to the Home (e)Node B 300/the L-GW—whether LIPA is permitted (LIPA permission)
What the Home (e)Node B transmits to the UE 100—LIPA notification FIG. 10 is a block diagram of a Home (e)Node B 300 and an MME 510 according to the present invention.

As depicted in FIG. 10, the Home (e)Node B 300 includes a storing means 301, a controller 302, and a transceiving unit 303. And, the MME 510 includes a storing means 511, a controller 512, and a transceiving unit 513.

The storing means 301/511 are configured to store a method depicted in FIG. 5 to FIG. 9.

The controllers 302/512 are configured to control the storing means 301/511 and the transceiving units 303/513. Specifically, the controllers are configured to execute the methods stored in the storing means 301/511, respectively. And, the controllers 302/512 are configured to transmit the aforementioned signals via the transceiving units 303/513.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

What is claimed is:

1. A method of controlling a service in a network entity in charge of a control plane in a network, the method comprising:
   receiving subscription information including information related to a selected Internet protocol (IP) traffic offload (SIPTO),
   wherein the information indicates whether the SIPTO is allowed and whether a SIPTO at a local network is excluded;
   triggering a re-establishment of the SIPTO for a packet data network (PDN) connection when a movement of a user equipment from an (e)Node B to a Home (e)Node B is detected;
   allowing the SIPTO excluding the SIPTO at the local network for an access point name (APN) of the PDN connection when the information indicates that the SIPTO is allowed and the SIPTO at the local network is excluded for the APN; and
   allowing the SIPTO including the SIPTO at the local network for the APN when the information indicates that the SIPTO is allowed and the SIPTO at the local network is included for the APN.

2. The method of claim 1, wherein agreement information of a user for the SIPTO is contained in an information response message received in response to an information request message transmitted to the user equipment.

3. The method of claim 2, wherein the subscription information is received when the user equipment performs an attach procedure, a Tracking Area Update (TAU) procedure, or a handover procedure, and
   wherein the attach procedure, the TAU procedure, and the handover procedure are performed by the user equipment when the movement of the user equipment from the (e)Node B to the Home (e)Node B is detected.

4. The method of claim 1, further comprising:
   determining whether a local IP access (LIPA) service is provided to the user equipment;
   transmitting LIPA service permission information or filter information to a local gateway according to a decision; and
   transmitting at least one of the LIPA service permission information, the filter information, and a notification for the LIPA service to the Home (e)node B.

5. The method of claim 4, wherein the LIPA service permission information or the filter information is used to determine whether the Home (e)Node B or the local gateway blocks data for the LIPA service occurred by the user equipment, and
   wherein the notification for the LIPA service is used to inform the user equipment of whether the LIPA service is permitted.

6. A network entity in charge of a control plane in a network, the network entity comprising:
   a transceiving unit; and
   a control unit configured to control the transceiving unit,
   wherein the control unit is further configured to:
       control the transceiving unit to receive subscription information including information related to a selected Internet protocol (IP) traffic offload (SIPTO),
       wherein the information indicates whether the SIPTO is allowed and whether a SIPTO at a local network is excluded,
       trigger a re-establishment of the SIPTO for a packet data network (PDN) connection when a movement of a user equipment from an (e)Node B to a Home (e)Node B is detected,
       allow the SIPTO excluding the SIPTO at the local network for an access point name (APN) of the PDN connection when the information indicates that the SIPTO is allowed and the SIPTO at the local network is excluded for the APN, and
       allow the SIPTO including the SIPTO at the local network for the APN when the information indicates that the SIPTO is allowed and the SIPTO at the local network is included for the APN.

7. The network entity of claim 6, wherein agreement information of a user for the SIPTO is contained in an information response message received in response to an information request message transmitted to the user equipment.

8. The network entity of claim 7, wherein the information response message containing the agreement information of the user for the SIPTO is received when the user equipment performs an attach procedure, a Tracking Area Update (TAU) procedure, and a handover procedure, and
   wherein the attach procedure, the TAU procedure, and the handover procedure are performed by the user equipment when the movement of the user equipment from the (e)Node B to the Home (e)Node B is detected.

9. The network entity of claim 7, wherein the subscription information is received when the user equipment performs an attach procedure, a Tracking Area Update (TAU) procedure, and a handover procedure, and
   wherein the attach procedure, the TAU procedure, and the handover procedure are performed by the user equipment when the movement of the user equipment from the (e)Node B to the Home (e)Node B is detected.

\* \* \* \* \*